(12) United States Patent
Natanzon et al.

(10) Patent No.: US 10,250,679 B1
(45) Date of Patent: Apr. 2, 2019

(54) ENABLING SNAPSHOT REPLICATION FOR STORAGE

(71) Applicant: EMC Corporation, Hopkinton, MA (US)

(72) Inventors: Assaf Natanzon, Tel Aviv (IL); Leehod Baruch, Rishon Leziyon (IL); Jehuda Shemer, Kfar Saba (IL); Lev Ayzenberg, Petach Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 382 days.

(21) Appl. No.: 15/084,810

(22) Filed: Mar. 30, 2016

(51) Int. Cl.
*H04L 29/08* (2006.01)
*G06F 3/06* (2006.01)
*G06F 11/20* (2006.01)

(52) U.S. Cl.
CPC ........ *H04L 67/1095* (2013.01); *G06F 3/0604* (2013.01); *G06F 3/065* (2013.01); *G06F 3/067* (2013.01); *G06F 3/0619* (2013.01); *G06F 3/0629* (2013.01); *G06F 11/2087* (2013.01); *G06F 11/2089* (2013.01); *G06F 11/2094* (2013.01); *H04L 67/1097* (2013.01)

(58) Field of Classification Search
CPC . H04L 67/1095; H04L 67/1097; G06F 3/065; G06F 3/067; G06F 3/0646; G06F 3/0604; G06F 3/0639; G06F 11/2069; G06F 11/2089; G06F 11/2094
See application file for complete search history.

(56) References Cited

U.S. PATENT DOCUMENTS

| | | | | |
|---|---|---|---|---|
| 8,433,869 B1* | 4/2013 | Natanzon | ................ | G06F 3/065 707/634 |
| 8,543,609 B1* | 9/2013 | Natanzon | .............. | G06F 3/0619 707/791 |
| 8,712,962 B1* | 4/2014 | Natanzon | .............. | G06F 3/0619 707/634 |
| 8,725,691 B1* | 5/2014 | Natanzon | ............ | H04L 67/1097 707/640 |
| 8,850,143 B1* | 9/2014 | Natanzon | ................ | G06F 3/065 707/684 |
| 8,862,546 B1* | 10/2014 | Natanzon | ............ | G06F 11/1471 707/637 |
| 8,935,498 B1* | 1/2015 | Natanzon | ............ | G06F 11/2087 707/655 |
| 9,361,194 B2* | 6/2016 | Long | ................... | H04L 67/1095 |
| 9,658,797 B1* | 5/2017 | Elliott, IV | .............. | G06F 3/065 |
| 9,875,042 B1* | 1/2018 | Natanzon | ................ | G06F 3/0619 |
| 10,042,579 B1* | 8/2018 | Natanzon | ................ | G06F 3/065 |
| 10,067,694 B1* | 9/2018 | Natanzon | ................ | G06F 3/067 |

(Continued)

OTHER PUBLICATIONS

EMC, "Virtual Provisioning for the EMC VNX2 Series", Mar. 2016, https://www.emc.com/collateral/white-papers/h12204-vp-for-new-vnx-series-wp.pdf.*

*Primary Examiner* — Ramy M Osman

(74) *Attorney, Agent, or Firm* — Krishnendu Gupta; Deepika Bhayana

(57) ABSTRACT

A computer implemented method, system, and computer program product comprising splitting IO directed to a LUN on a production site to a first thin LUN, determining to take a snapshot of the LUN at a point in time, reconfiguring the IO split from the LUN on the production site to be split to a second thin LUN, and copying changes from the first thin LUN to a protection storage device.

20 Claims, 21 Drawing Sheets

(56) References Cited

U.S. PATENT DOCUMENTS

| | | | |
|---|---|---|---|
| 2002/0103968 A1* | 8/2002 | Grover | G06F 11/2087 |
| | | | 711/114 |
| 2003/0172149 A1* | 9/2003 | Edsall | G06F 3/0605 |
| | | | 709/224 |
| 2007/0011424 A1* | 1/2007 | Sharma | H04L 67/1097 |
| | | | 711/165 |
| 2011/0276963 A1* | 11/2011 | Wu | H04L 67/1097 |
| | | | 718/1 |
| 2016/0266811 A1* | 9/2016 | Long | H04L 67/1095 |

* cited by examiner

ENABLING SNAPSHOT REPLICATION FOR STORAGE

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Another conventional data protection system uses data replication, by generating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

A computer implemented method, system, and computer program product comprising splitting IO directed to a LUN on a production site to a first thin LUN, determining to take a snapshot of the LUN at a point in time, reconfiguring the IO split from the LUN on the production site to be split to a second thin LUN, and copying changes from the first thin LUN to a protection storage device.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
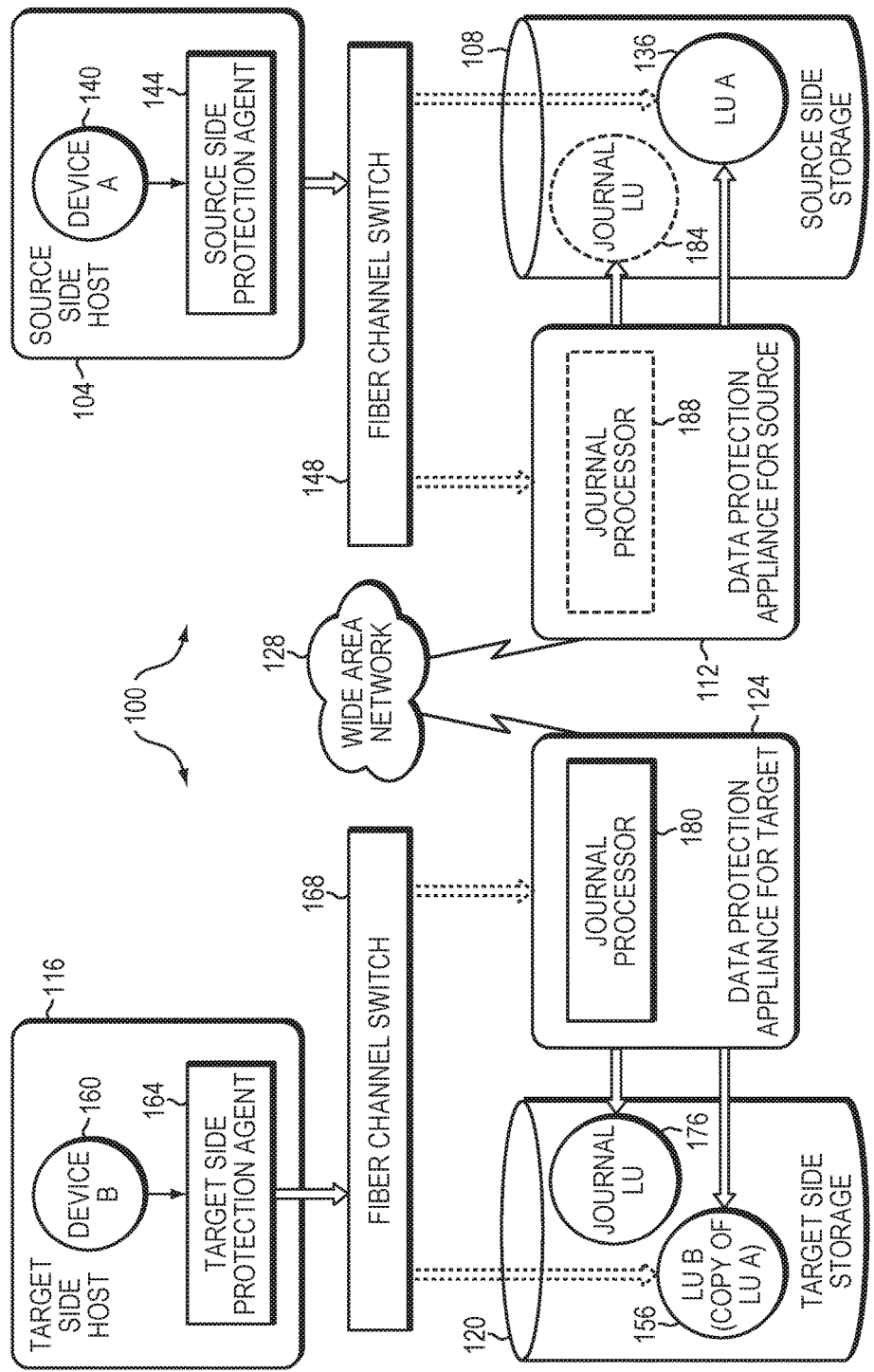
FIG. 1 is a simplified illustration of a data protection system, in accordance with an embodiment of the present disclosure.

Typically, there may not be a way to perform snapshot-based replication on arrays that do not support snapshots. In certain embodiments, techniques described here may enable snapshot-based replication with little impact on production performance. In some embodiments, techniques described herein may be used on any production array that does not support snapshots or when native snapshots degrades production performance. For example, certain techniques described herein may be used to perform snapshot-based replication of virtual machines in order to backup them to a deduplicated storage system. In some examples, certain techniques allow saving the snapshot differentials in a different and sometimes dedicated storage, and thus have almost no effect on the production environment.

In many embodiments, a deduplicated secondary storage array may not handle random I/O workload and/or overlapping I/Os. In certain embodiments snapshot shipping may be a technique which may allow sending large bulks of data to protection storage.

In certain embodiments, the current disclosure may enable snapshot based replication for protected device or devices, such as a LU, LUN, or consistency group, in an environment where snapshots are not supported. In certain embodiments herein, a LU, LUN, and consistency group may be referred to interchangeably as a device or devices. In certain embodiments, the current disclosure may enable efficient snapshot based replication on a storage array or storage device that does not support snapshots using one or more thin volumes. In many embodiments, the current disclosure may enable efficient snapshot based replication on an array or storage device that does not have a snapshot capability using two thin LU or LUNs.

In many embodiments, the current disclosure may enable backing-up of snapshots to a back-up storage device, when the underlying array containing a device being backed up may not support creating of snapshots. In certain embodiments, a splitter may be used to create copies of IO written to a device or group of devices being protected into a thin device such as a thin LU or thin LUN. In many embodiments, a thin LU or LUN with copies of IO written to it may represent changes between two versions of a device or group of devices being backed up or protected at a point in time. In many embodiments, a first point in time may reside on a protection device and a thin LU or LUN tracking IO may represent changes to the first point in time. In certain embodiments, a copy of a LUN or LU on a production site may have been sent to a protection device. In most embodiments, if IO is not actively being written to a thin LU or LUN that has copies of IO written to device or devices being protected, that thin LU or LUN may represent a snapshot of the changes between two points in time, where the first point in time may exist on a protection storage device. In certain embodiments, a thin LU or LUN that has copies of IO written to a device or devices being protected, may represent a snapshot representing the differences between it and a previous point in time, where the previous point in time may have previously been shipped to a protection storage device. In many embodiments, the thin LUN or LU may represents the differences between two points in time and may be shipped to a protected storage device that may only support backing up of snapshots as a snapshot. In many embodiments, it may be advantageous to use a thin LUN to keep track of split IO as the thin LUN may only have space allocated according to the amount IO that has been split to it and storing the changes may take a minimal amount of space.

In certain embodiments, two thin devices may be used to create snapshots for a storage array that may not support snapshots. In many embodiments, two thin LUs or LUNs may be provisioned. In some embodiments, thin devices may be provisioned on a different array from where data may be protected. In many embodiments, two thin devices may be provisioned per volume protected. In other embodiments, two thin devices may be provisioned for each consistency group being protected. In most embodiments, if a thin volume is provisioned for a consistency group, then each thin volume may be equal to or greater than the summation of the sizes of the volumes being protected in the consistency group. In certain embodiments, a punch command may be a command that zeros or erases data on a thin volume. In some embodiments, a punch command may be used herein to refer to different commands to erase or zero data on a thin volume.

In certain embodiments, a thin device may be thought of as a journal if multiple devices are allocated to a thin LU or LUN. In some embodiments, a sub address space of a thin LU or LUN may be allocated for each LU replicated. In many embodiments, a splitter may intercept IOs arriving to a replicated device. In most embodiments, a splitter may write split IO to a mapped offset in a thin device. In certain embodiments, an offset in the LU may be mapped to an offset plus a constant offset in a thin device where the constant depends on the LU being protected. In some embodiments, when a system wants to create a snapshot, new IOs may be split to a second thin device. In many embodiments, a change tracker maintained by a splitter and/or a replication appliance may hold a list of locations which have changed in the thin LU. In some embodiments, tracked changes in combination with an existing snapshot on a protection storage device may represent a snapshot at a different point in time.

In certain embodiments, data from a thin LU or LUN may be sent to a protection storage device when the thin LU or LUN is not having IO split to it. In many embodiments, IO may be split to a second thin LU or LUN. In some embodiments, a fast copy of a thin LU or LUN nor receiving IO may be made. In most embodiments, data read from the non-active thin LU or LUN may be written to a copy in a protection storage device. In some embodiment, a punch command may be sent to a thin LU or LUN that has been copied to a protection storage device to erase or zero data copied to the protection storage device. In other embodiments, a different command may be used to erase or zero data copied from a thin LU or LUN to a storage protection device. In many embodiments, give data has been transferred from a non-active thin LU or LUN to a protection storage device, the transferred data may correspond to a new snapshot in the protection storage device. In most embodiments, zeroing or erasing data on the thin LU or LUN may cause the device to be empty. In many embodiments, IO may be tracked in a second think LU or LUN as a first device is copied and erased. In most embodiments, if multiple snapshots are desired, two thin LU or LUNs may be used repeatedly and interchangeably to be a non-active LU or LUN for copying to a storage protection device and a second thin LU or LUN for tracking changes while the non-active LU or LUN is copied. Conventionally, each time a new thin LU or LUN was used, a thin LU or LUN may have needed to be created and each time a thin LU or LUN was copied, the thin LU or LUN may have been deleted. In many embodiments, a thin LU or thin LUN may track the changes made to a LUN or LU since a point in time. In other embodiments, a splitter may track changes made to a LU or LUN for a given time period. In further embodiments, a data protection appliance or replication protection appliance may track changes that have been made to a Lu or LUN for a period of time. In certain embodiments, a data protection appliance may write changes arriving from a splitter to a thin LUN. In certain embodiments, metadata corresponding to changed data split by a splitter may be tracked in a journal. The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site; a target site may be referred to herein as a replication site;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

FAST: may be a fully automated storage tiering used to move active data to higher tiers and less active data to lower tiers.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes. Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. Only after receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3B, journal entries include four streams, two of which are written when write transaction are entered into the journal, and two of which are written when write transaction are applied and removed from the journal.

Figure 2:
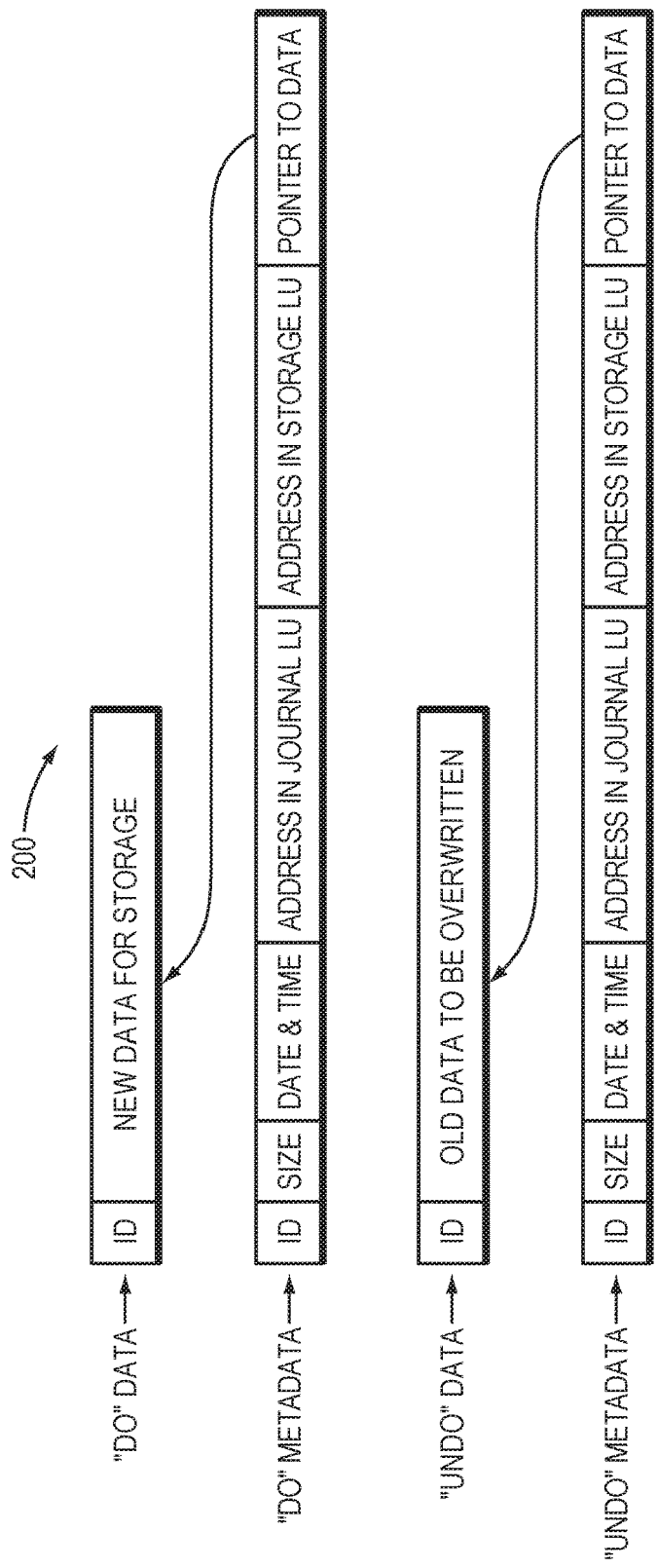
FIG. 2 is a simplified illustration of a write transaction for a journal, in accordance with an embodiment of the present disclosure.
Figure 3:
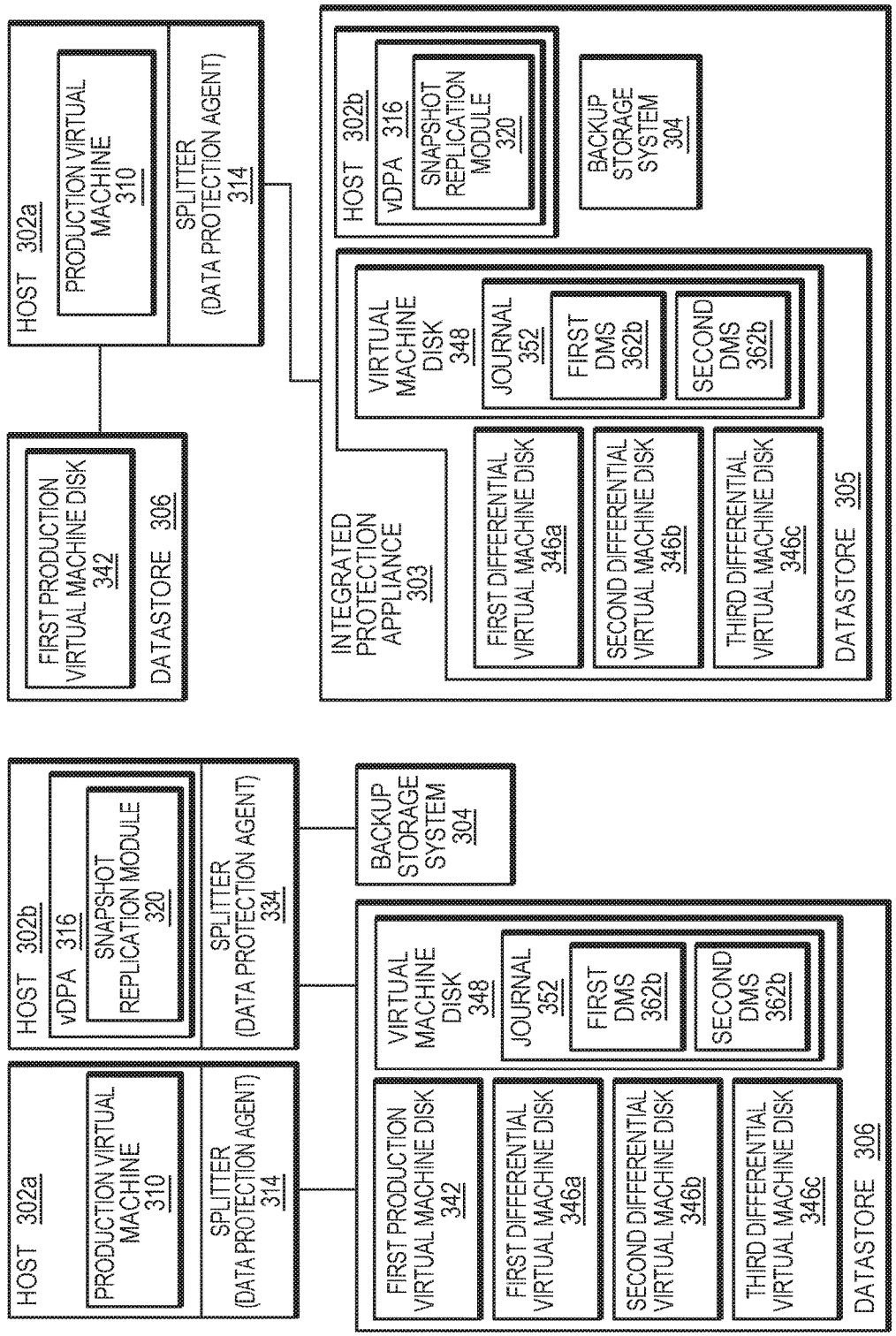
FIG. 3A is a block diagram of an example of a data protection system to perform snapshot replication on a storage system not configured to support snapshot replication, according to an embodiment of the disclosure.
FIG. 3B is a block diagram of another example of a data protection system to perform snapshot replication on a storage system not configured to support snapshot replication, according to an embodiment of the disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
 one or more identifiers;
 a time stamp, which is the date & time at which the transaction was received by source side DPA 112;
 a write size, which is the size of the data block;
 a location in journal LU 176 where the data is entered;
 a location in LU B where the data is to be written; and
 the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Referring to FIG. 3*a*, a data protection system 300 includes a host 302*a*, a host 302*b*, a backup storage system (e.g., a deduplicated storage system) 304 and a data store 306, according to an embodiment of the disclosure. The host includes a production virtual machine 310 and a splitter 314 (e.g., a data protection agent similar to the data protection agent 144). In one example, the host 302*a* is a hypervisor and the splitter 314 runs either in the hypervisor kernel or in another layer in the hypervisor such as VMWare VAIO which allows the splitter to intercept I/Os arriving at virtual machine disks (VMDKs). The host 302*b* includes a virtual data protection appliance (e.g., similar in functionality to the DPA appliance 124) having a snapshot replication module 320, and a splitter 334 (e.g., a data protection agent similar to the data protection agent 164). In one example, the splitter 334 is located on the host 302*b* to enable protection of virtual machines on the host 302*b*. In another example, the splitter 334 at the host 302*b* allows faster access to virtual machine disks from the vDPA 316 and allows also replication of other virtual machines which may run on the host 302*b*. In one example, one or more of the hosts 302*a*, 302*b* are VMWARE® ESXI® servers.

The datastore 306 includes virtual machine disk (e.g., a first production virtual machine disk 342), differential virtual machine disks (e.g., a first differential virtual machine disk 346*a* and a second differential virtual machine disk 346*b*) and a virtual machine disk 348. The differential virtual machine disks 346*a*-346*c* are called differential virtual machine disks because each are used to store differential snapshot data (i.e., the differential virtual machine disks 346*a*-346*c* may hold copies of the changes that happened to production virtual machine disk 342) In one example, the first differential virtual machine disk 346*a* may include the writes that occurred to the first production virtual machine 342 from time t1 to time t2, the second differential virtual machine disk 346*b* may include the changes that occurred to the production virtual machine disk 342 from time t2 to time t3, and the third differential virtual machine disk 346*c* may include changes that occurred to the production virtual machine disk 342 from time t2 to time t3. A journal 352 is stored on the virtual machine disk 348. In one example, the differential virtual machine disks 346*a*-346*c* are thin provisioned.

In some examples, differential virtual machine disks 346*a*-346*c*, the virtual machine disk 348 may be stored in a different datastore than production virtual machines disk 342, so that writes and reads arriving to the differential virtual machine disks 346*a*-346*c* will have no effect on production performance (e.g., performance in writing and reading from the virtual machine 310 to the first production virtual machine disk 342). As used herein, a datastore is a file system installed on a logical unit on a NAS that includes virtual machine disks.

The journal 352 includes delta marker streams (DMS) (e.g., a first DMS 362*a* and a second DMS 362*b*). A DMS includes the metadata (i.e., the list locations that may be different between the one differential virtual machine disk and another differential virtual machine disk).

In one example, the first DMS includes the metadata differences between the current copy of the production VMDKs 342 and the copy currently in the backup storage 304. The journal 352, is not like the journals 176, 184 described in FIGS. 1 and 2. That is, the journal 352 does not include the data changes; but rather, the metadata of the changes. The data of the changes are stored in the differential virtual machine disks.

Referring to FIG. 3B, a system 300' is another example of a data protection system to perform snapshot replication on a storage system not configured to support snapshot replication, according to an embodiment of the disclosure. The system 300' includes a host 302*a*, an integrated protection appliance 303 and a datastore 306 including the first production virtual machine disk 342. The integrated protection appliance 303 includes the host 302*b*, the backup storage 304 and a datastore 305. The datastore 305 includes the first, second and third differential virtual machine disks 346*a*-346*c* and the virtual machine disk 348, which includes the journal 352. In some examples, the system 300' allows backup and protection of data into the backup storage without any disruption to the production work (e.g., writing to the first production virtual machine disk 342 by the host 302*a*).

Figure 4:
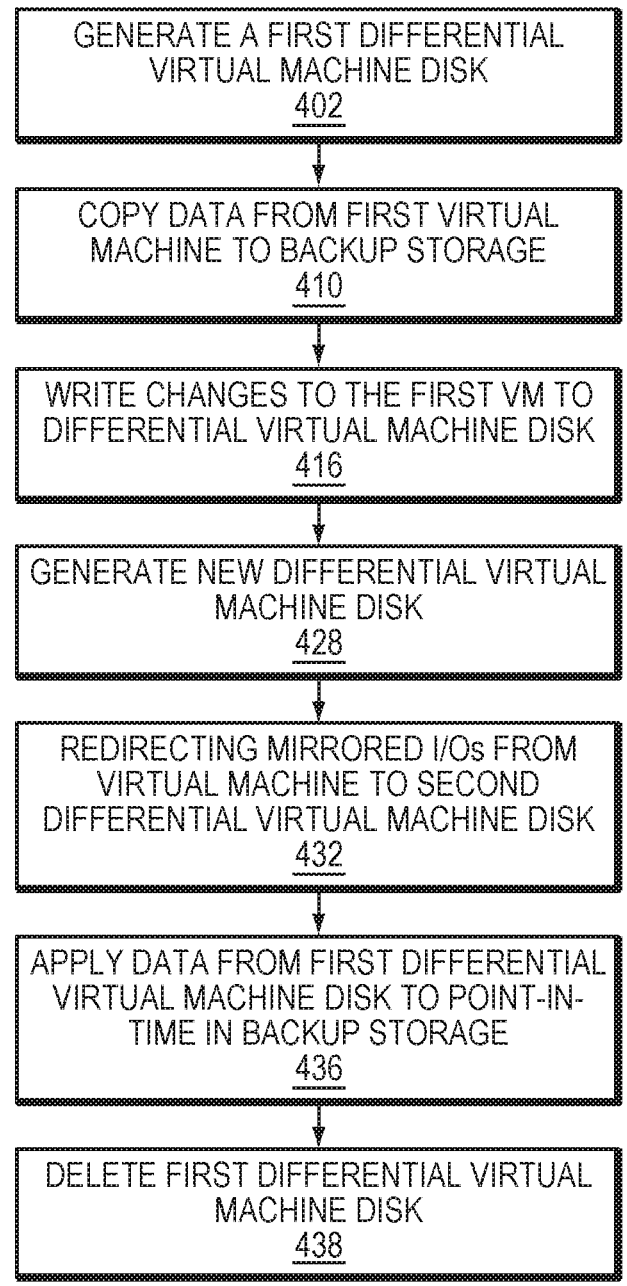
FIG. 4 is a flowchart of an example of a process to generate an initial snapshot into the backup storage, according to an embodiment of the disclosure.

Referring to FIG. 4, a process 400 is an example of a process to generate an initial snapshot into the backup storage, according to an embodiment of the disclosure.

Process 400 generates a virtual machine disk (402). For example, the vDPA 316 generates a first virtual machine disk 346*a* that will include changes and a delta marker stream (DMS) on journal 352. In one example, the first virtual machine disk 346*a* is thin provisioned.

Process 400 copies data from a first virtual machine to a backup storage (410). For example, the vDPA 316 copies data of the first VM 310 (i.e. reading data from production virtual machine disk 342) into the backup storage 304. In one example, the copying happens while the data is changing so that the copy in the backup storage 304 is not consistent.

Process 400 writes changes to the first virtual machine to the first differential virtual machine disk (416). For example, vDPA 316 writes changes to the first virtual machine 310 to the first differential virtual machine disk 346a. For example, the splitter 314 intercepts the write I/O commands which arrive to the production virtual machine disk 342, and sends them to vDPA 316. The vDPA 316 marks the metadata of changed location in the DMS 362a (e.g., the offset and the volume of the writes), and acknowledges the I/Os. The splitter 314 writes the I/O to the first production virtual machine disk 342 and asynchronously vDPA 316 writes the data arriving from the splitter 314 to the differential virtual machine disk 346a.

Once a non-consistent copy for first virtual machine disk 342 is generated on the backup storage 304, process 400 generates a new differential virtual machine disk (428). For example, vDPA 316 generates a second differential virtual machine disk 346b. In one example, the second differential virtual machine disk 346b is thin provisioned.

Process 400 redirects mirrored I/Os from virtual machine to the second thin differential virtual machine disk (432). For example, the splitter 334 sends the IO to vDPA 316a, and once vDPA acknowledge the IO the splitter sends the I/O to VMDK 342, vDPA 316 then asynchronously writes the IO to the second differential virtual machine disk 346b, and tracks the metadata of the IO in the second DMS.

Process 400 applies data from the first differential virtual machine disk to point-in-time in backup storage (436). For example, vDPA 316 applies data from the first differential virtual machine disk 346a to a point-in-time in backup storage 304 (e.g., vDPA 316 reads the list of changed locations from the first DMS 362a and, for each changed location, vDPA 316 reads the changes from first differential virtual disk 346a and write the changes to backup storage system 304).

Process 400 deletes first differential virtual machine disk (438). For example, after processing block 436 the backup storage 304 has a consistent point, and vDPA 316 deletes the first differential virtual machine disk.

Figure 5:
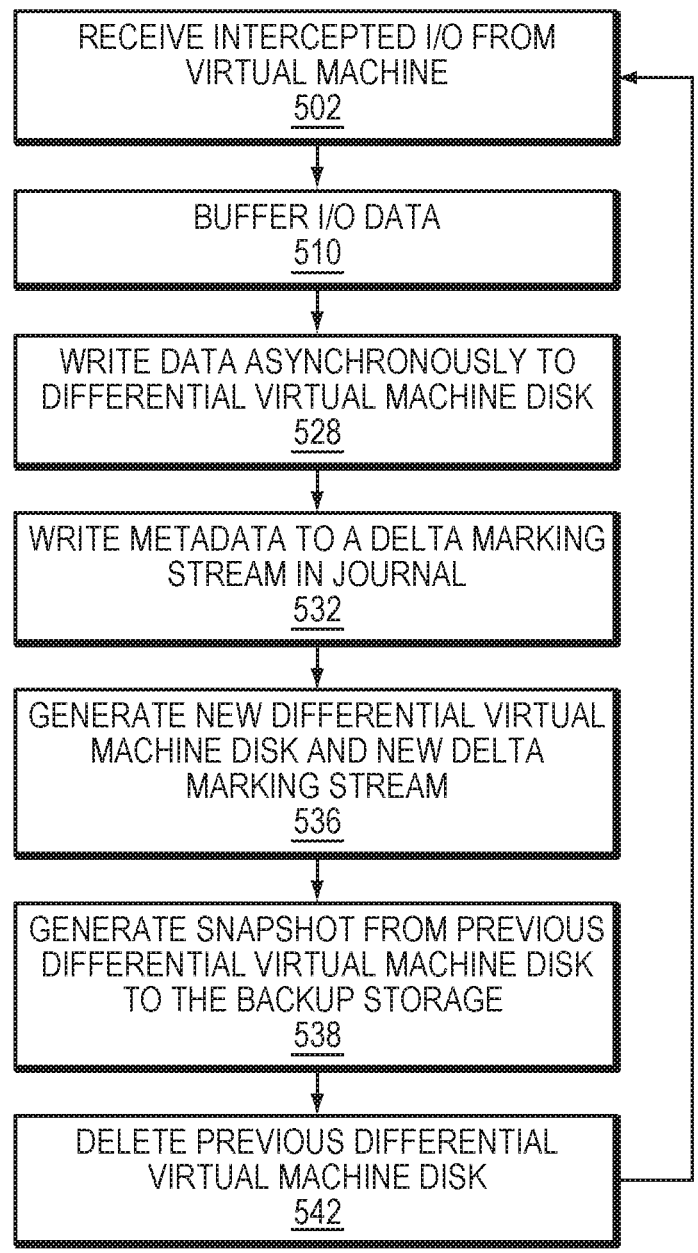
FIG. 5 is a flowchart of an example of a process to perform snapshot replication on a storage system not configured to support snapshot replication, according to an embodiment of the disclosure.

Referring to FIG. 5, a process 500 is an example of a process to perform snapshot replication on a storage system not configured to support snapshot replication, according to an embodiment of the disclosure. In one example, the process 500 is performed by the snapshot replication module 320. It will be appreciated by one of ordinary skill in the art that the second differential machine disk 346b and the second DMS 362b in FIG. 3 have not been generated prior to execution of process 500.

Process 500 receives intercepted I/O from virtual machine (502). For example, the I/O is intercepted by the splitter 314 and sent to the datastore 306 (e.g., through an iSCSI or through like TCP/IP any other protocol) and received by the vDPA 316).

Process 500 buffers the I/O data (510) and sends an acknowledgment (516). For example, the vDPA 316 buffers the I/O data in memory of vDPA 316 and sends an acknowledgement that it received the I/O to the splitter 314, which in turn writes the I/O to the first production virtual machine disk 342a.

Process 500 writes I/O data asynchronously to the differential virtual machine disk (528) and metadata to a delta marking stream in journal (532). For example, the vDPA 316 writes the I/O data asynchronously to the differential virtual machine disk 346b and writes the I/O metadata to the first DMS 362a.

When the system 500 generates a snapshot for a point-in-time to be stored in the protection storage, process 500 generates a new differential virtual machine disk and a new delta marking stream (536). For example, the system or the user requests generating a point-in-time snapshot of the production VM 310 (e.g., generating a point-in-time copy of the virtual disks of VM 310, (i.e., production virtual machine disk 342)) in order to push the point-in-time copy of the data to the backup storage 304, vDPA 316 generates the differential machine disk 346c and the second DMS 362b to track further changes.

Process 500 generates a snapshot of the copy in the backup storage (538). For example, the vDPA 316 generates a snapshot of the copy in the in the backup storage 304 and applies the differences from the differential disk 346b to a copy of the data in the backup storage 304, so that the backup storage 304 holds both copy of the old point-in-time and the new point-in-time.

Process 500 deletes previous differential virtual machine disk (542). For example, the vDPA 316 deletes the differential virtual machine disk 346b.

After processing block 542 the process 500 repeats.

In one example, the backup storage system 304 may be remote or local. In one example, the differential virtual machine disks 346a-346c may be configured on a different datastore than the production virtual machine disk 342 which will have minimum impact on production performance (e.g., writing I/Os from the VM 310 to the production virtual machine disk 342). In some examples, the marking on the differential virtual machine disk and replicating snapshots may be performed on different vDPAs to boost performance.

Thin LUNS

Figure 6:
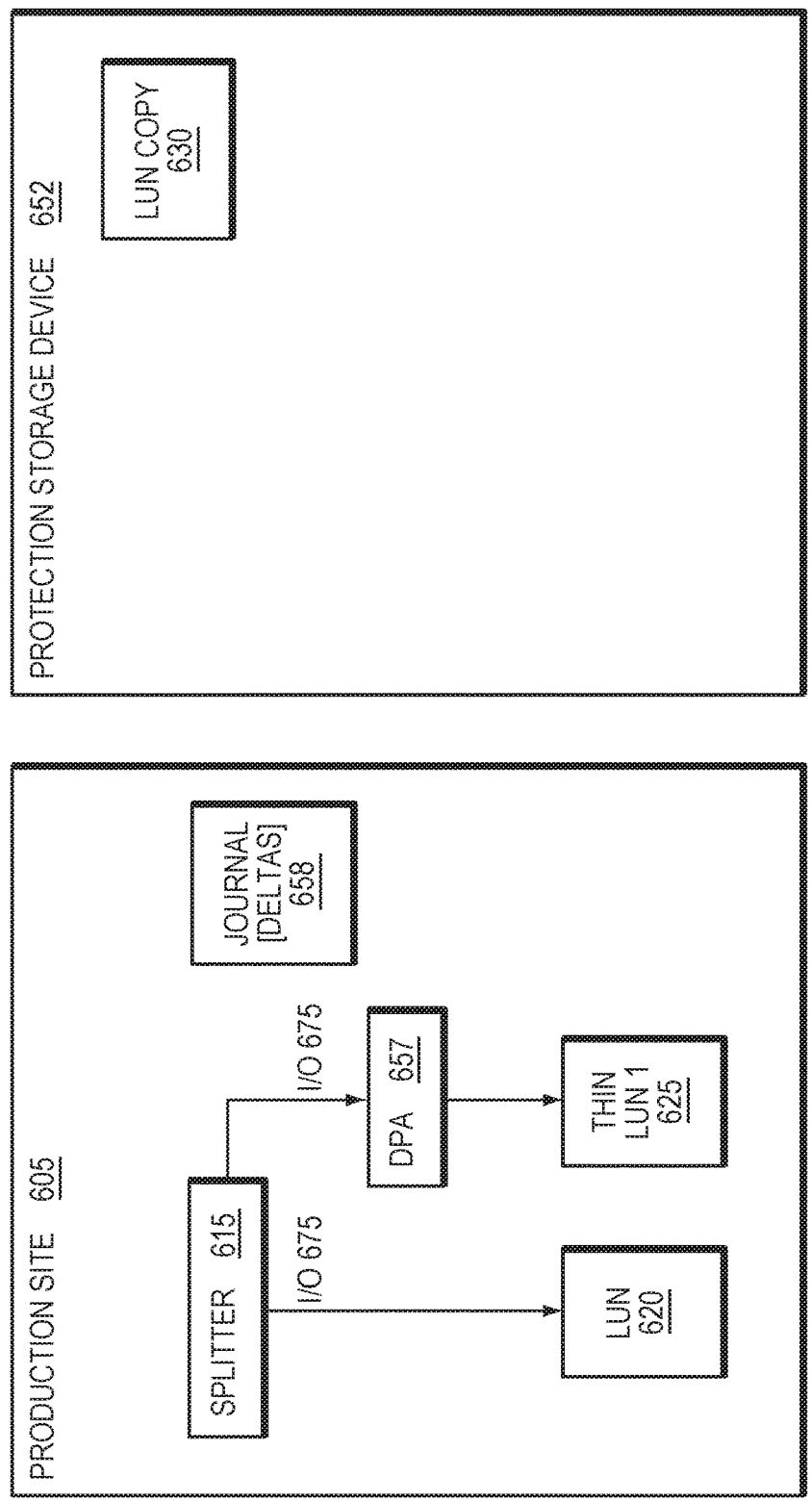
FIG. 6 is a simplified illustration of a data protection system with IO sent to a LUN being split to a thin LUN, in accordance with an embodiment of the present disclosure.
Figure 9A:
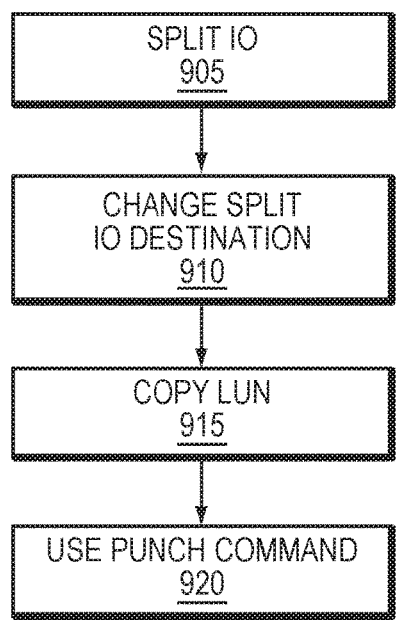
FIG. 9a is a simplified example of a method for enabling a snapshot using a thin volume, in accordance with an embodiment of the present disclosure.

Refer now to the example embodiments of FIGS. 6 and 9a, which illustrate IO being split to a thin LUN. In the example embodiment, production site 605 has splitter 615. Splitter 615 intercepts IO 675 that is being written to LUN 620. IO 675 may be written by one or more hosts. Splitter 615 creates a copy of IO 675 and sends the copy of IO 675 to thin LUN 1 625 (step 905). In this embodiment, splitter 615 tracks the IO changes that are send to thin LUN 1 625 in journal 658. In this embodiment thin LUN 1 625 keeps a copy of the IO sent to LUN 620. As well, thin LUN 1 625 has space thinly allocated so it does not need to be a fixed size, rather may change in size according to the amount of IO that has been split to thin LUN 1 625. Also pictured is Protection Storage Device 652. Protection Storage Device 652 may store snapshots copied to it from production site 605. Protection storage device 652 has LUN snap 630, which represents a copy or snapshot of LUN 620 at a point in time. In other embodiments, changes sent to thin LUN 1 625 may be determined by querying the thin LUN 1 625 what portions of the LUN are not thin. In other embodiments, an API may be used to determine what portions of the thin LUN 1 625 are not thin.

Figure 7:
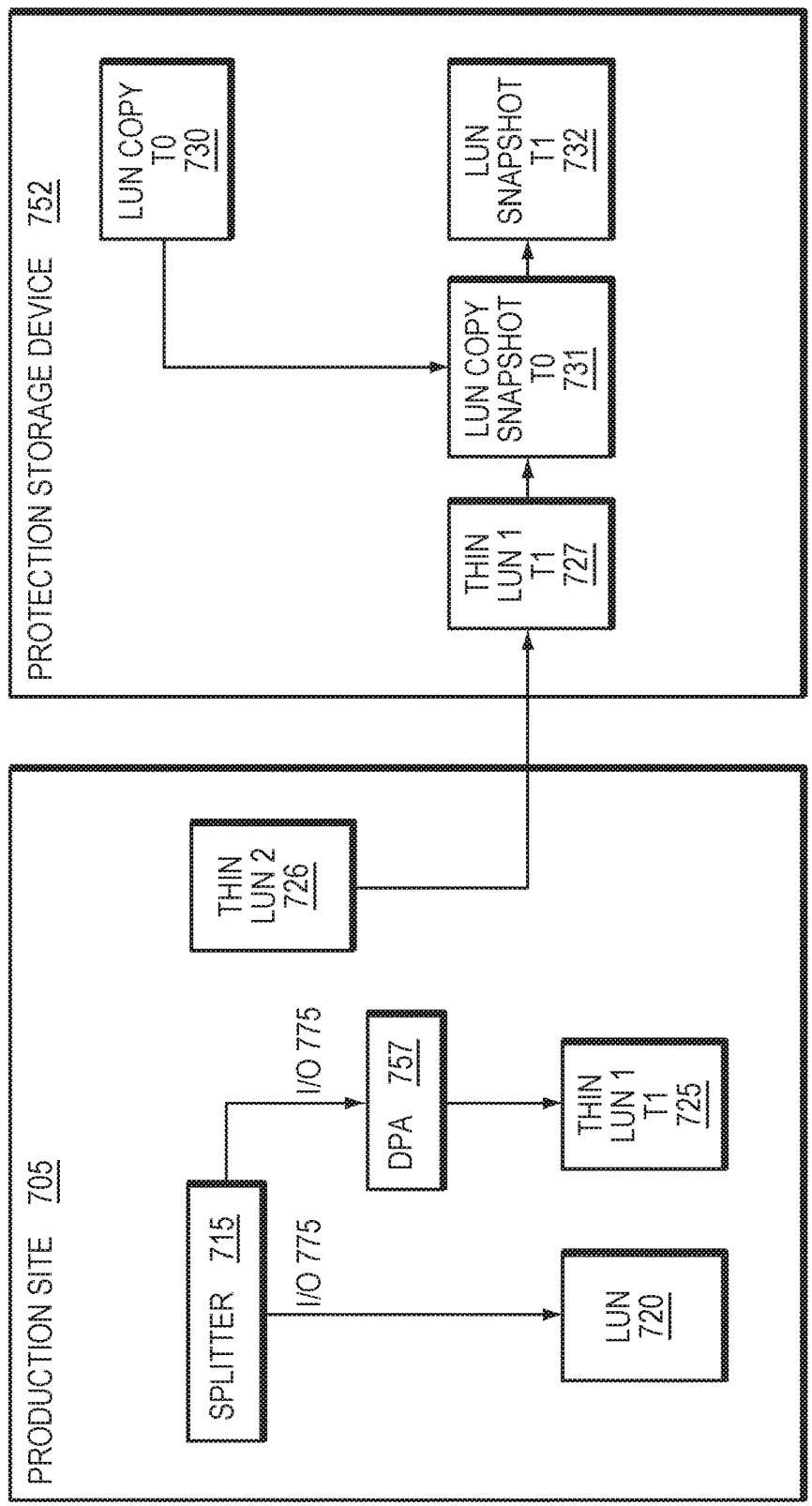
FIG. 7 is a simplified illustration of a data protection system with IO sent to a LUN being split to a second thin LUN and copying a first thin LUN to a protection storage device, in accordance with an embodiment of the present disclosure.
Figure 9B:
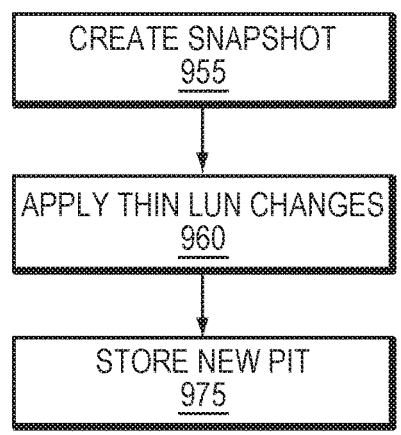
FIG. 9b is a simplified example of a method for updating a snapshot using a thin volume, in accordance with an embodiment of the present disclosure.

Refer now to the example embodiments of FIGS. 7, 9a, and 9b, which illustrate copying a thin LUN to a protection storage device. In the example embodiment of FIG. 7, splitter 715 has changed the location of the data being split from LUN 720 (step 910). In this embodiment, IO from splitter 715 is not sent to Thin LUN 1, T1 725. Rather, in this embodiment IO from splitter 715 is sent to thin LUN 2 726. In this embodiment, thin LUN 1 T1 725 represents the differences between a snapshot in the storage protection device and the IOs written to LUN 720 at time T1. Changes being written to LUN 720 are being tracked in thin LUN 2 726. In this embodiment, the differences represented by thin LUN 1 T1 are being copied to Protection storage Device 752 as thin LUN 1 T1 Copy 727 (step 915). In some embodiments, in order to know which locations have been changed in a thin LUN, metadata tracking written to the thin LUN may be used. In other embodiments, an API may be used to determine what portions of the thin LUN are allocated or not thin and these changes may be copied to the protection storage device. Referring back to FIG. 7, LUN snapshot 730 on protection storage device represents a point in time T0 of LUN 720 and thin LUN 1 T1 Copy 727 represent the differences between that point in time T0 of LUN snapshot 730 and the point in time T1 corresponding for LUN 720. A snapshot 731 of the latest point in time or snapshot 730 on protection storage device 752 is taken (step 955). The changes of thin LUN 1 T1 Copy 727 are applied to snapshot 731 to create LUN snapshot T1 732 (step 960). Snapshot or new PIT 731 is stored (step 975).

Figure 8:
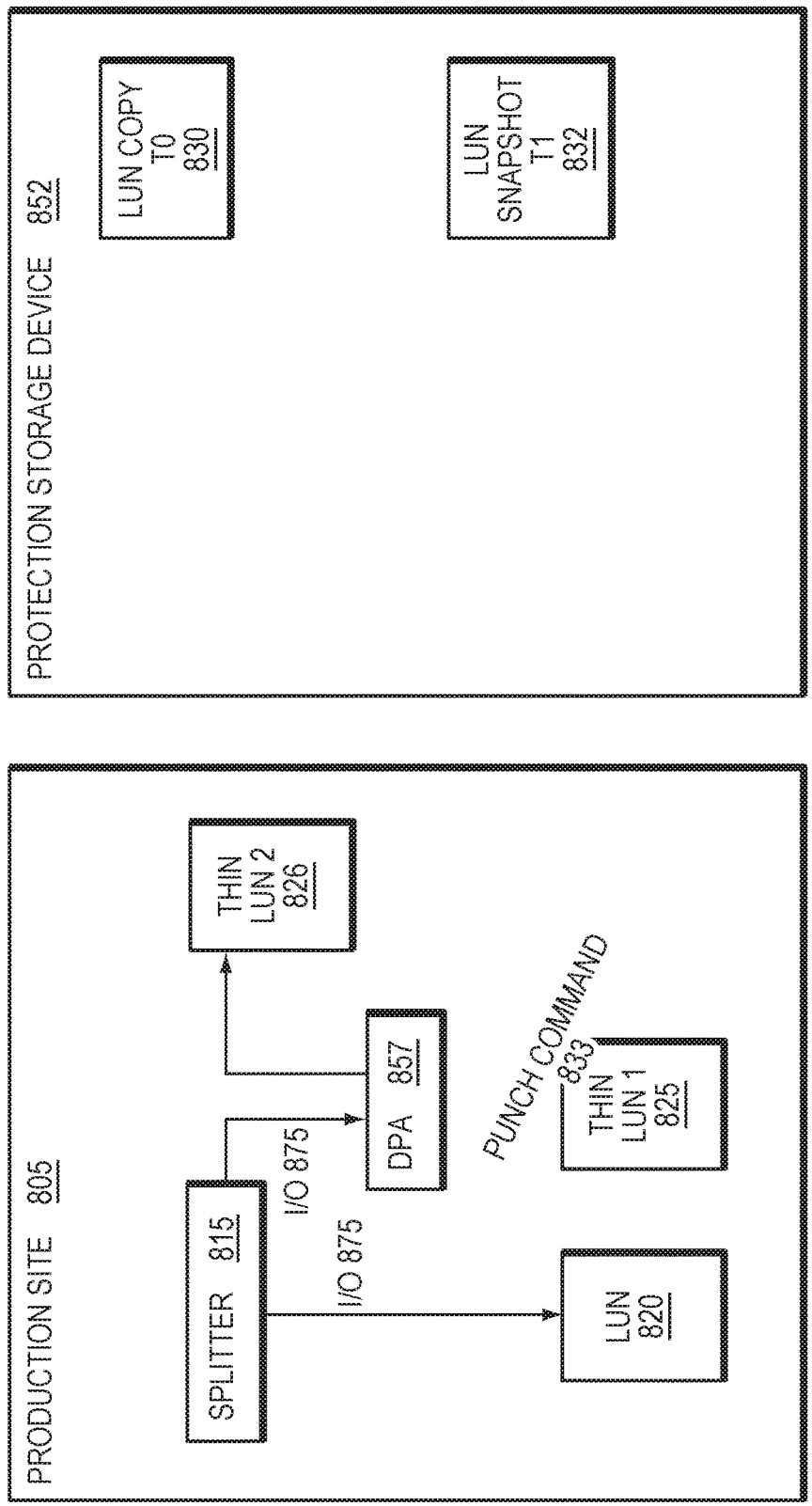
FIG. 8 is a simplified illustration of a data protection system with IO sent to a LUN being split to a second thin LUN and applying a punch command to a first thin LUN, in accordance with an embodiment of the present disclosure.

Refer now to the example embodiments of FIGS. 8 and 9a, which illustrate applying a punch command to a thin LUN. In the example embodiment of FIG. 8, IO from splitter 815 is sent to thin LUN 2 826. In this embodiment, the snapshot differences represented by thin LUN 1 825 which represented the changes until time (T1) is being cleared, erased, or zeroed by Punch command 833 (step 920). Applying Punch command 833 to thin LUN 1 825 readies the LUN to begin tracking new IO sent to LUN 820. In this embodiment, Protection storage device 852 has LUN copy at time T0 830 and LUN snapshot at time T1 832. In certain embodiments, clearing of data using a punch command may occur as data is transferred to protection storage device 852 and all data need not be transferred before transferred data has begun to be cleared.

Figure 10:
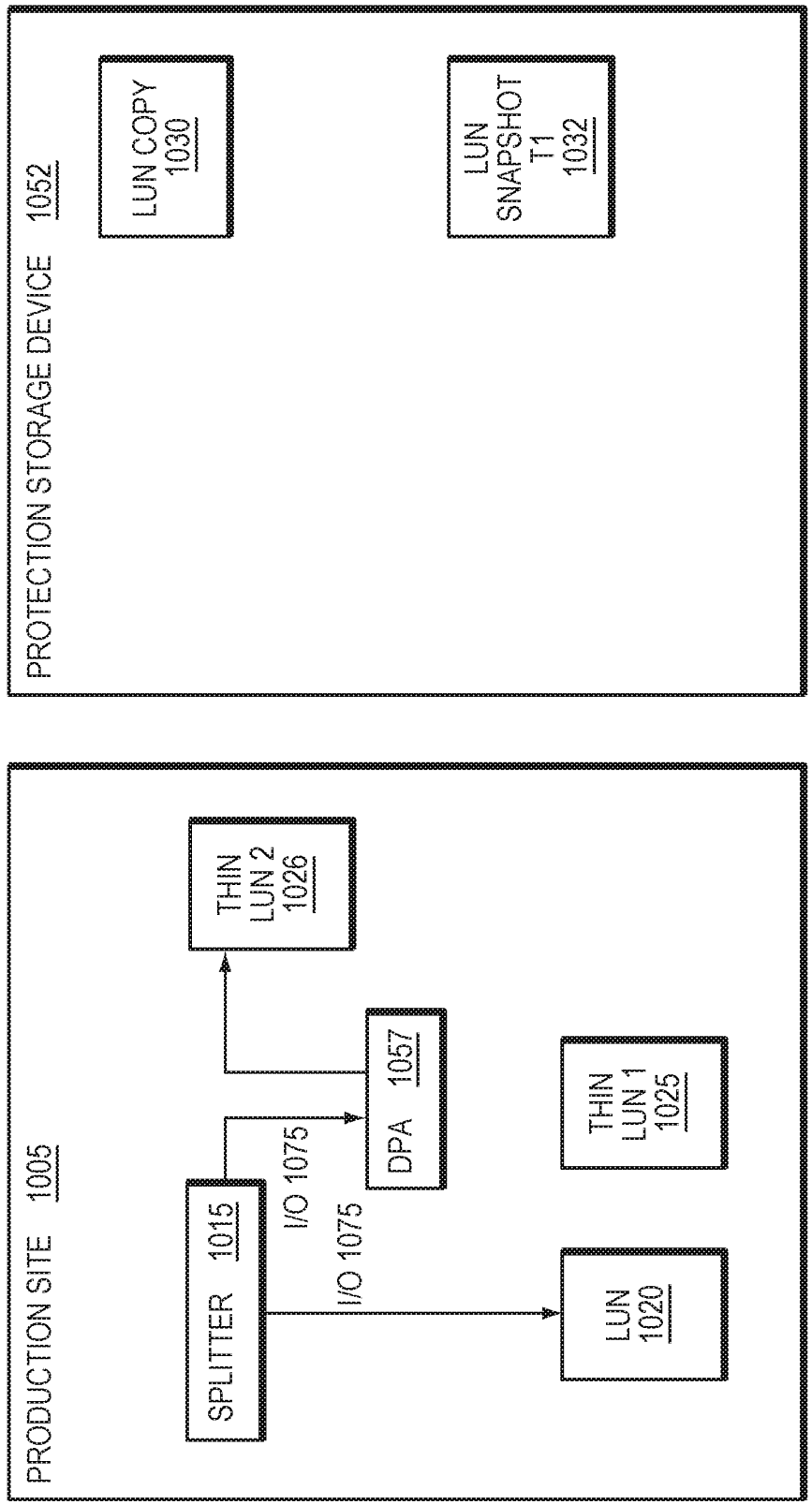
FIG. 10 is a simplified illustration of a data protection system with IO sent to a LUN being split to a second thin LUN, in accordance with an embodiment of the present disclosure.

Refer now to the example embodiments of FIGS. 10 and 9a, which illustrate IO being split to a thin LUN. In this example embodiment, FIG. 10 represents a figure similar to that of FIG. 6. Splitter 1015 intercepts IO 1075 that is being written to LUN 1020. IO 1075 may be written by one or more hosts. However, FIG. 10 differs from FIG. 6 in that Splitter 1015 creates a copy of IO 1075 and sends the copy of IO 1075 to thin LUN 2 1026 (step 905). In this embodiment thin LUN 1 1025 keeps a copy of the IO sent to LUN 1020. As well, thin LUN 1 1025 has space thinly allocated so it does not need to be a fixed size, rather may change in size according to the amount of IO that has been split to thin LUN 1025. Also pictured is Protection Storage Device 1052, which contains thin LUN 1 copy 1027, which represents a snapshot at a previous point in time. In this embodiment, thin LUN 2 1026 represents changes that happened between LUN 1 copy 1027 which represent LUN 1020 at time T1 and the current time.

Figure 11:
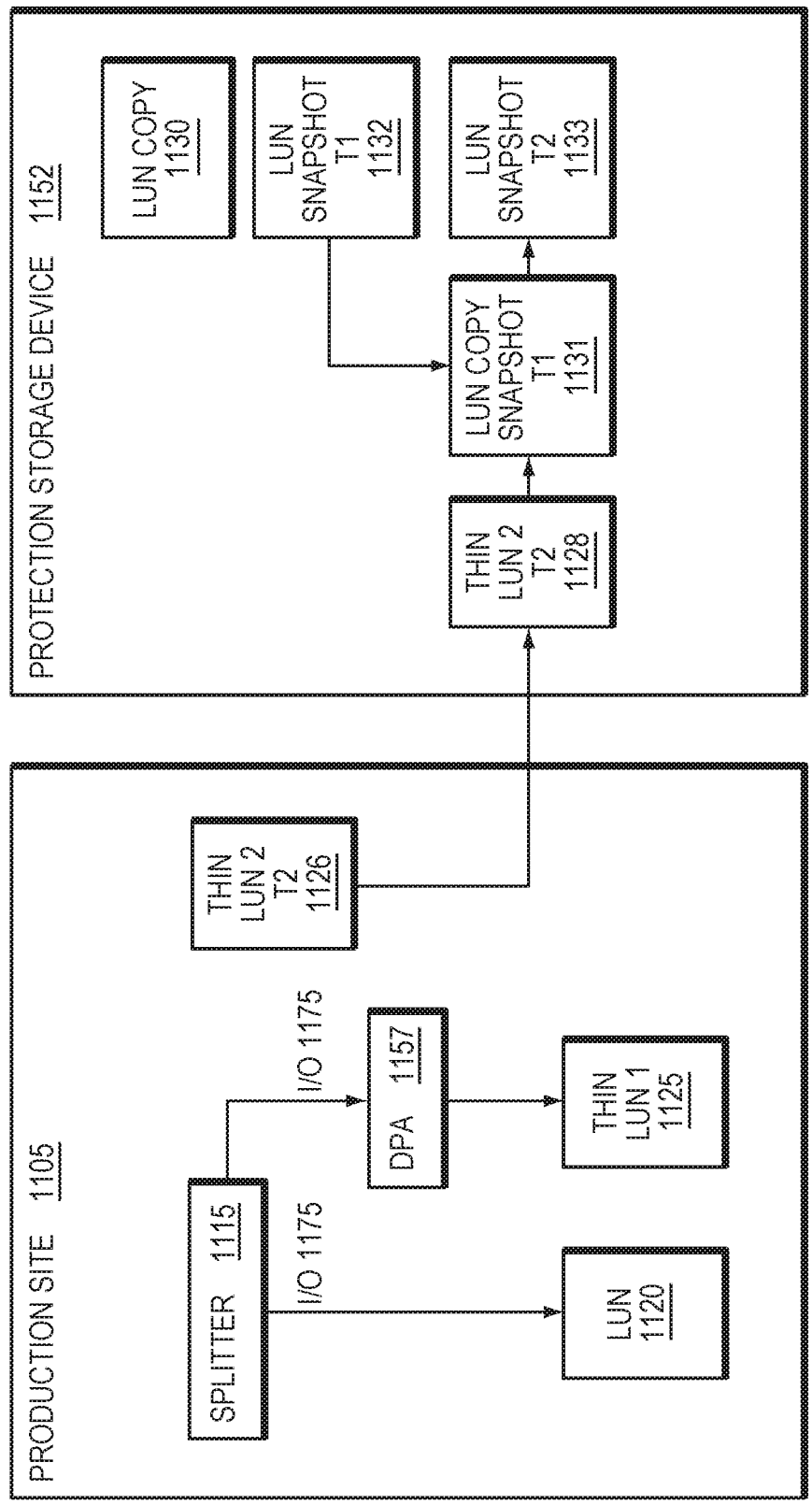
FIG. 11 is a simplified illustration of a data protection system with IO sent to a LUN being split to a first thin LUN and copying a second thin LUN to a protection storage device, in accordance with an embodiment of the present disclosure.

Refer now to the example embodiments of FIGS. 11, 9a, and 9b, which illustrate copying a thin LUN differences to a protection storage device. FIG. 11 is similar to that of FIG. 7. In the example embodiment of FIG. 11, splitter 1115 has changed the location of the data being split from LUN 720 (step 910). Different from FIG. 7, in this embodiment, IO from splitter 1115 is not sent to thin LUN 2 which represents now the changes that happened to LUN 1120 from time T1 to time T2 1126. Rather, in this embodiment IO from splitter 1115 is sent to thin LUN 1 1125. In this embodiment, thin LUN 2 T2 1126 represents differences from the snapshot of IO written to LUN 1120 from time T1 to time T2. Changes being written to LUN 1120 are being tracked in thin LUN 1 1125. In this embodiment, the differences represented by thin LUN 2 T2 1126 are being copied to Protection storage Device 1152 as thin LUN 2 T2 Copy 1128 (step 915). A snapshot 1131 of the latest point in time or snapshot 1132 on storage detection device 1152 is taken (step 955). The changes of thin LUN 1 T2 Copy 1128 are applied to snapshot 1131 to create LUN snapshot T2 1133 (step 960). Snapshot or new PIT 1133 is stored (step 975).

Figure 12:
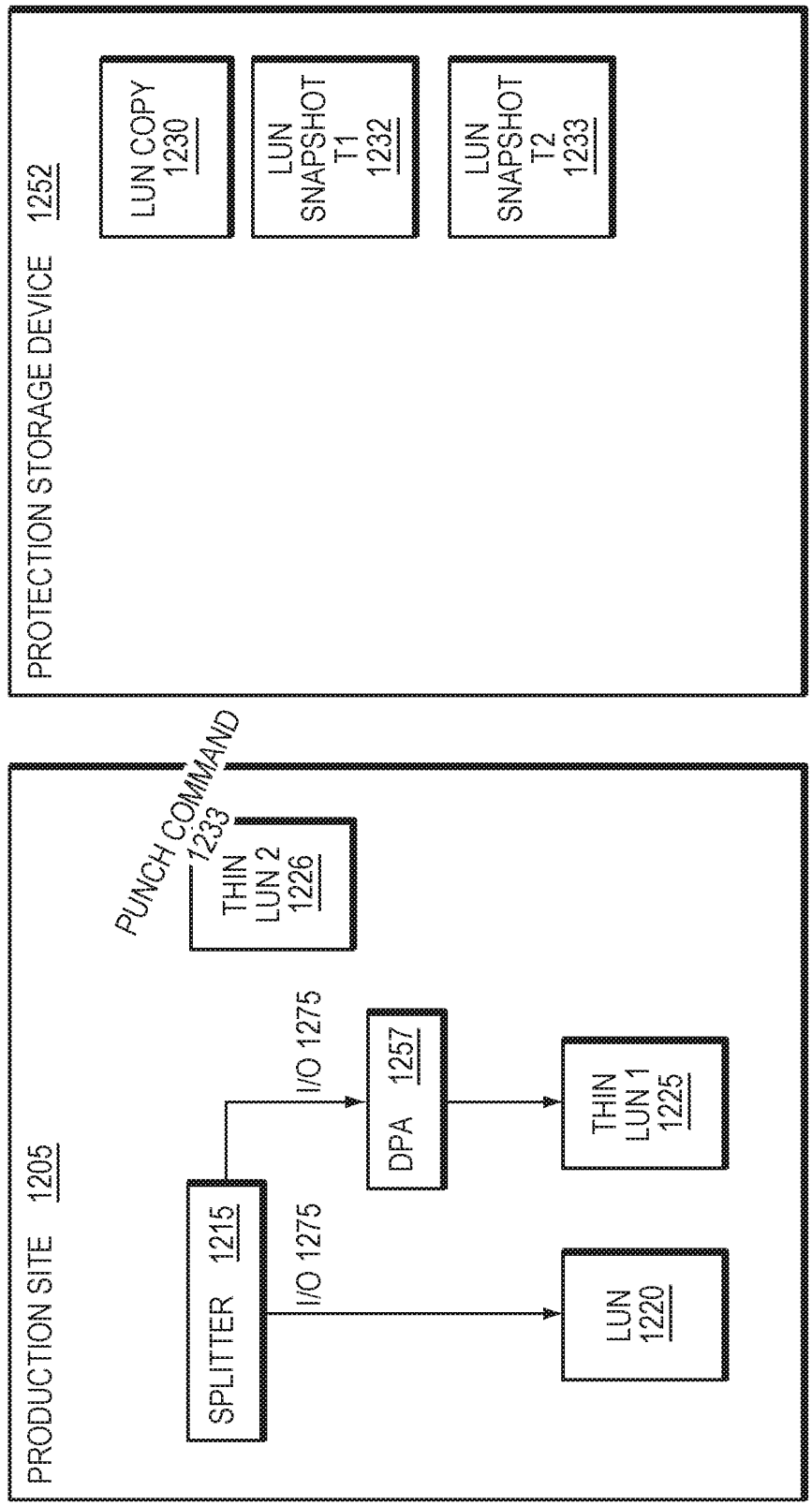
FIG. 12 is a simplified illustration of a data protection system with IO sent to a LUN being split to a first thin LUN and applying a punch command to a second thin LUN, in accordance with an embodiment of the present disclosure.

Refer now to the example embodiments of FIGS. 12 and 9a, which illustrate applying a punch command to a thin LUN. This example embodiment is similar to that of FIG. 8. In the example embodiment of FIG. 12 and different from FIG. 8, IO from splitter 1215 is sent to thin LUN 1 1225. In this embodiment, the snapshot represented by thin LUN 2 T2 1226 is being cleared, erased, or zeroed by Punch command 1233 (step 920). Applying Punch command 1233 to thin LUN 2 1226 readies the LUN to begin tracking new IO sent to LUN 1220. In some embodiments, applying a punch command may be done simultaneously to copying the data from a thin LUN to a protection storage.

Figure 13:
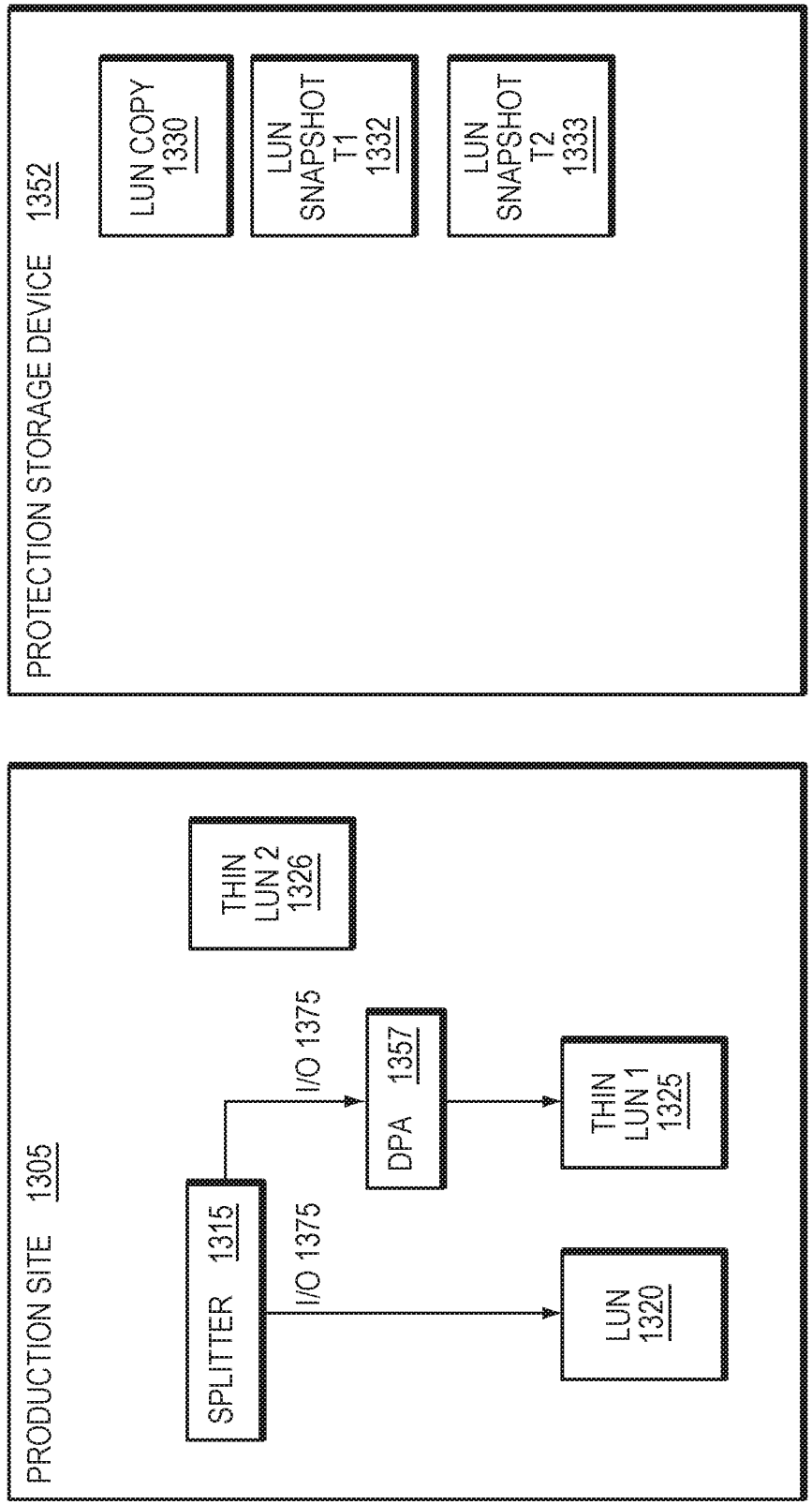
FIG. 13 is a simplified illustration of a data protection system with IO sent to a LUN being split to a first thin LUN with a zeroed second thin LUN, in accordance with an embodiment of the present disclosure.

Refer now to the example embodiments of FIGS. 13 and 9a, which illustrate IO being split to a thin LUN. This example embodiment is similar to FIG. 6. In the example embodiment, production site 1305 has splitter 1315. Splitter 1315 intercepts IO 1375 that is being written to LUN 1320. IO 1375 may be written by one or more hosts. Splitter 1315 creates a copy of IO 1375 and sends the copy of IO 1375 to thin LUN 1 1325 (step 905). In this embodiment thin LUN 1 1325 keeps a copy of the IO sent to LUN 1320. As well, thin LUN 1 1325 has space thinly allocated so it does not need to be a fixed size, rather may change in size according to the amount of IO that has been split to thin LUN 1325. Thin LUN 2 1326 has been erased/zeroed or cleared and is set to be able to track changes split from splitter 1315. Also pictured is Protection Storage Device 1352. Protection Storage Device 1352 stores snapshots at points of time T1 and T2. In this embodiment, Thin LUN 1 1325 contains the changes which happened from time T2.

In certain embodiments, the method of FIG. 9 may be applied iteratively to achieve snapshots at different points of time that may be copied to a protection storage device.

Figure 14:
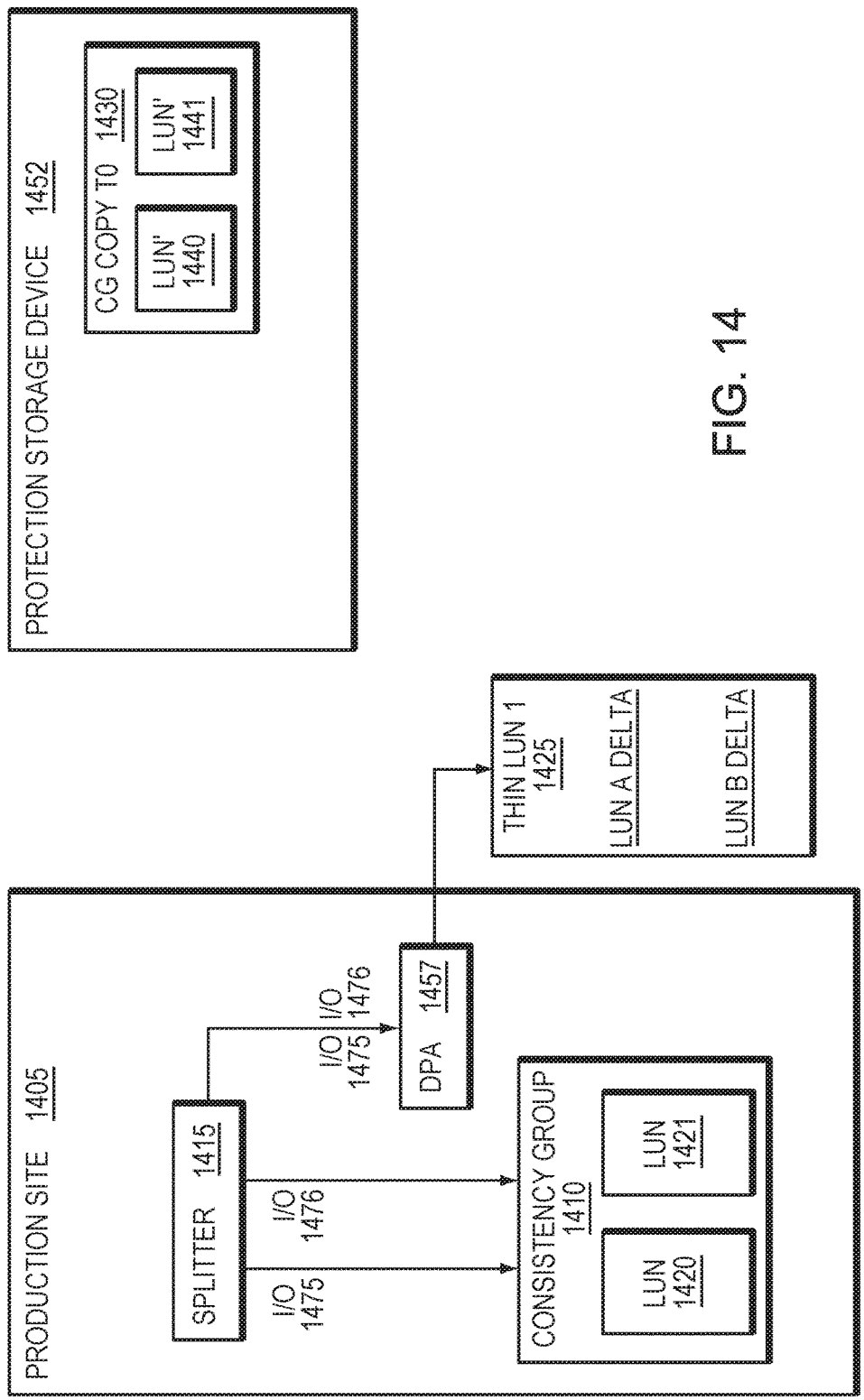
FIG. 14 is a simplified illustration of a data protection system with IO sent to a LUN being split to a thin LUN, where the thin LUN is not located on the production site, in accordance with an embodiment of the present disclosure.

Refer now to the example embodiments of FIGS. 9a and 14, which illustrate a splitter splitting IO from a consistency group to a thin LUN. In the example embodiment of FIG. 14, production site 1405 has splitter 1415 that splits IO 1475 and 1476 which are being sent to LUN 1420 and LUN 1421 of consistency group (CG) 1410 (Step 905). In this embodiment, consistency group 1410 represents a grouping of logical volumes that need to be kept consistent with respect to each other. Splitter 1415 sends IO 1475 and IO 1476 to Thin LUN 1 1425. It is ensured that the IOs are kept consistent and written to corresponding LUN A delta or LUN B delta of thin LUN 1 1425. In this embodiment LUN A delta of thin LUN 1 1425 has IO copies that were split from LUN 1420 and LUN B delta of LUN 1 1425 has IO copies that were split from LUN 1421 of consistency group 1410. In this embodiment, thin LUN 1 1425 has an offset that enables IO directed to different LUNs to be written to a different portion of thin LUN 1 1425. In some embodiments, changes sent to a thin LUN may be determined by querying the thin LUN what portions of the LUN are not thin. In other embodiments, an API may be used to determine what portions of the thin LUN are not thin.

Protection Storage Device 1452 has CG copy 1430. CG snap (snapshot) 1430, also referred to as CG Copy 1430, has LUN' 1440, which represents a copy of LUN 1420 at a point in time T0. CG Copy 1430 also has LUN'1441, which represents a copy of LUN 1421 at the same point in time. In some embodiments, LUN' 1440 and LUN' 1441 may be stored in a file format. In the embodiment of FIG. 14, the changes to the point in time are being written to thin LUN 1 1425 as well as to consistency group 1410.

In the embodiment of FIG. 14, there are two LUNs in the consistency group, in other embodiments there may be multiple LUNs in a consistency group. In most embodiments, a splitter may receive writes from one or more hosts. In the embodiment of FIG. 14, Thin LUN 1 1425 is not stored on production site 1405. In other embodiments, a thin LUN may be stored on a production site. In further embodiments, a thin LUN may be stored on a production site but on a different storage array or different storage device from a LUN, LU, or consistency group.

Figure 15:
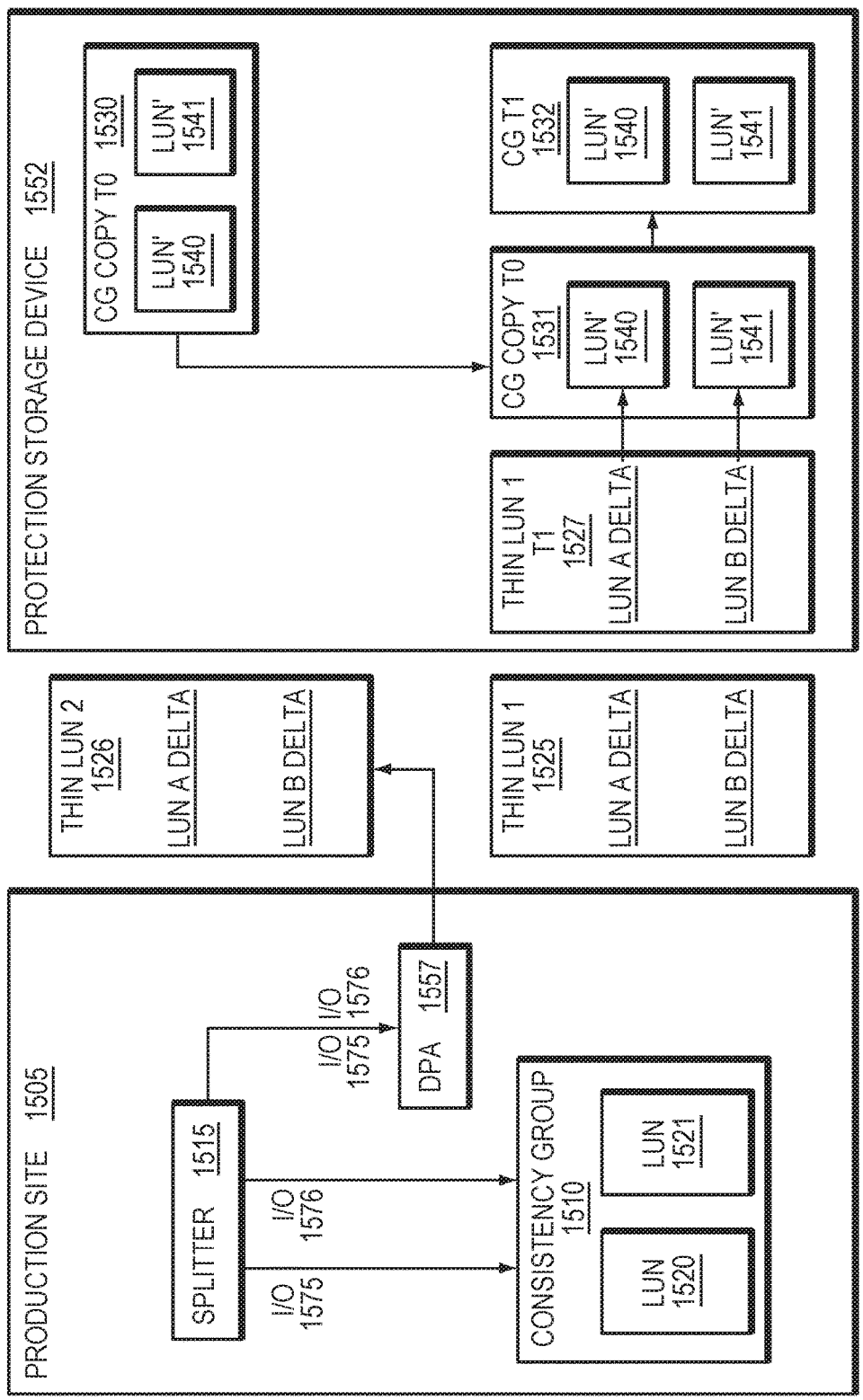
FIG. 15 is a simplified illustration of a data protection system with IO sent to a LUN being split to a second thin LUN and copying a first thin LUN to a protection storage device, where the first and second thin LUNs are not on the production site, in accordance with an embodiment of the present disclosure.

Refer now to the example embodiments of FIGS. 9*a*, 9*b* and 15, which illustrate copying a thin LUN to a protection storage device. In the example embodiment of FIG. 15, splitter 1515 has changed the location of the data being split from consistency group 1510 from thin LUN 1 1525 to thin LUN 2 1526 (step 910). In this embodiment, LUN A delta of thin LUN 2 1526 corresponds to IO written to LUN 1520 and LUN B delta of thin LUN 2 1526 represents the IO written to LUN 1521. In this embodiment, thin LUN 1 T1 1525 represents the differences between snapshot 1530 in storage protection device 1552 and the IOs written to LUN 1520 and LUN 1521 of consistency group 1510 at time T1. Changes being written to LUN 1520 and LUN 1521 of consistency group 1510 are being tracked in thin LUN 2 1526. In this embodiment, the snapshot of differences represented by thin LUN 1 T1 1525 are being copied to Protection storage Device 1552 as thin LUN 1 T1 Copy 1527 (step 915). LUN A delta of thin LUN 1 T1 Copy 1527 represent changes to LUN' 1540, which itself represents a previous point in time of LUN 1520, and LUN B delta of thin LUN 1 T1 Copy 1527 represent changes to LUN' 1541, which itself represents a previous point in time of LUN 1521.

A snapshot 1531 of the latest point in time or snapshot of CG 1530 on storage detection device 1552 is taken (step 955). The changes of thin LUN 1 T1 Copy 1127 are applied to snapshot 1531 to create LUN snapshot T1 1532 (step 960). Snapshot or new PIT 1532 is stored (step 975).

Figure 16:
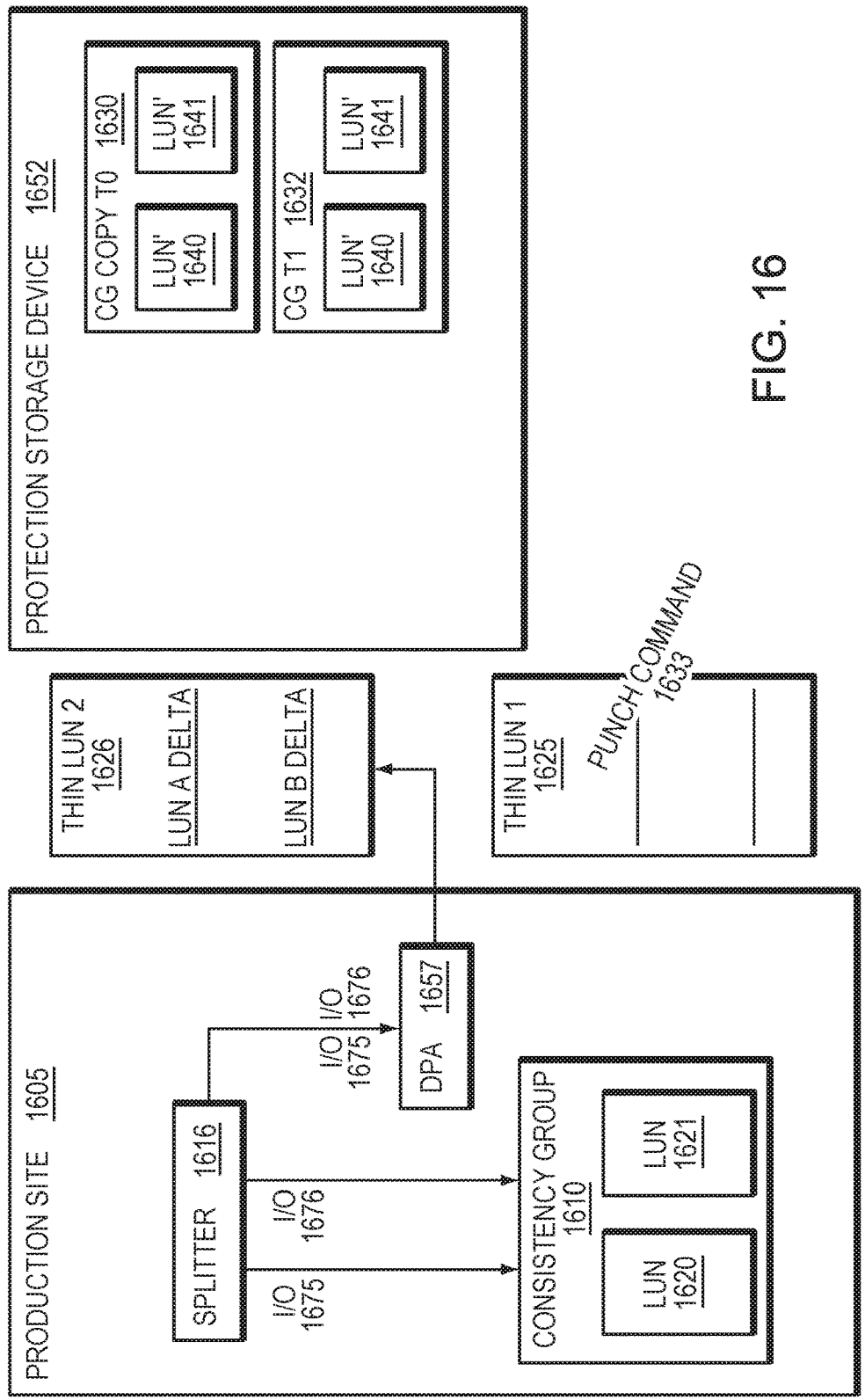
FIG. 16 is a simplified illustration of a data protection system with IO sent to a LUN being split to a second thin LUN and applying a punch command to a first thin LUN, where the first and second thin LUNs are not on the production site, in accordance with an embodiment of the present disclosure.

Refer now to the example embodiments of FIGS. 9*a* and 16, which illustrate applying a punch command to a thin LUN. In the example embodiment of FIG. 16, IO from splitter 1616 is sent to thin LUN 2 1626. In this embodiment, the snapshot differences represented by thin LUN 1 1625 are being cleared, erased, or zeroed by Punch command 1633 (step 920). Applying Punch command 1633 to thin LUN 1 1625 readies the LUN to begin tracking new IO sent to LUN 1620 and LUN 1621 of Consistency group 1610. In certain embodiments, clearing of data using a punch command may occur as data is transferred to protection storage device 1652 and all data need not be transferred before transferred data has begun to be cleared.

Figure 17:
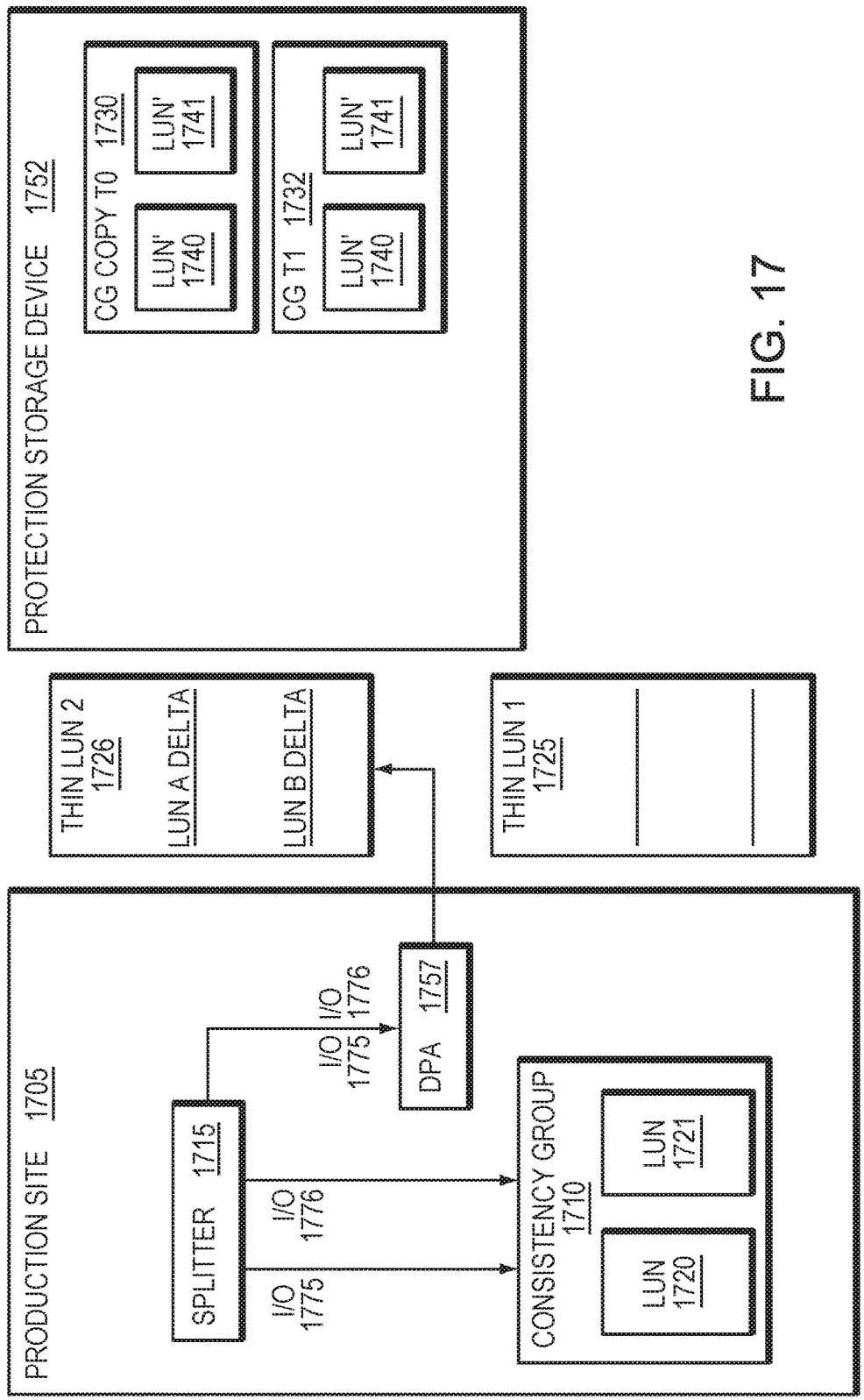
FIG. 17 is a simplified illustration of a data protection system with IO sent to a LUN being split to a second thin LUN, where the first and second thin LUNs are not on the production site, in accordance with an embodiment of the present disclosure.

Refer now to the example embodiment of FIG. 17, which illustrates splitting IO to a second thin LUN. In this example embodiment IOs sent to consistency group 1710 are being split to thin LUN 2 1726. Thin LUN 1 1725 is empty or zeroed.

Figure 18:
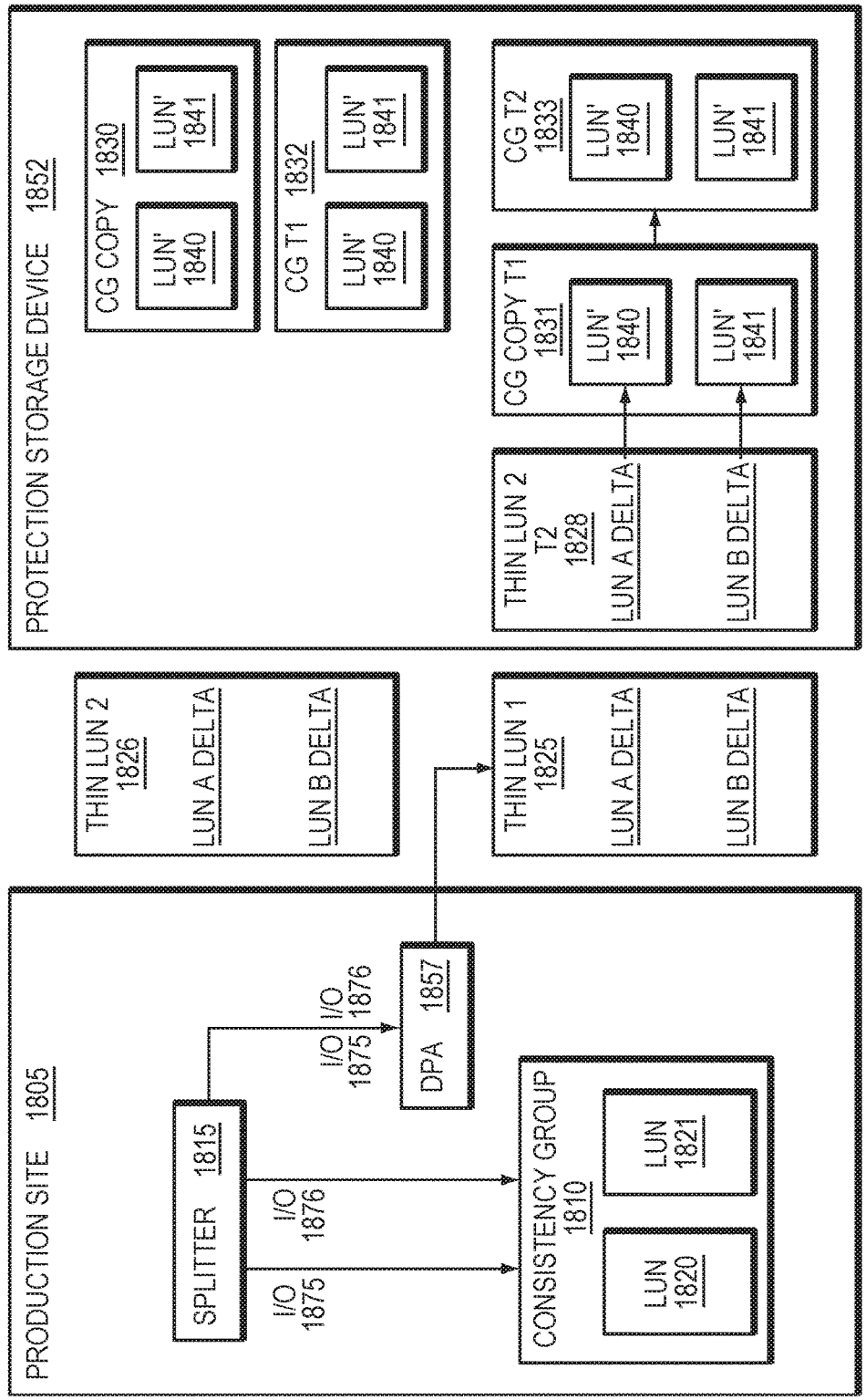
FIG. 18 is a simplified illustration of a data protection system with IO sent to a LUN being split to a first thin LUN and copying a second thin LUN to a protection storage device, where the first and second thin LUNs are not on the production site, in accordance with an embodiment of the present disclosure.

Refer now to the example embodiments of FIGS. 9*a*, 9*b*, and 18, which illustrate copying a thin LUN to a protection storage device. In the example embodiment of FIG. 18, splitter 1815 has changed the location of the data being split from consistency group 1810 from thin LUN 2 1826 to thin LUN 1 1825 (step 910). In this embodiment, LUN A delta of thin LUN 2 1826 corresponds to IO written to LUN 1820 and LUN B delta of thin LUN 2 1826 represents the IO written to LUN 1821. In this embodiment, thin LUN 2 1826 represents the differences between snapshot 1830 in storage protection device 1852 and the IOs written to LUN 1820 and LUN 1821 of consistency group 1810 at time T2. Changes being written to LUN 1820 and LUN 1821 of consistency group 1810 are being tracked in thin LUN 1 1825. In this embodiment, the snapshot of differences represented by thin LUN 2 1826 are being copied to Protection storage Device 1852 as thin LUN 2 T2 1828 (step 915). LUN A delta of thin LUN 2 T2 1828 represent changes to LUN' 1840, which itself represents a previous point in time of LUN 1820, and LUN B delta of thin LUN 2 T2 1828 represent changes to LUN' 1841, which itself represents a previous point in time of LUN 1821. A snapshot 1831 of the latest point in time or snapshot of CG 1832 on storage detection device 1852 is taken (step 955). The changes of thin LUN 2 T2 1828 are applied to snapshot 1831 to create LUN snapshot T2 1833 (step 960). Snapshot or new PIT 1832 is stored (step 975).

Figure 19:
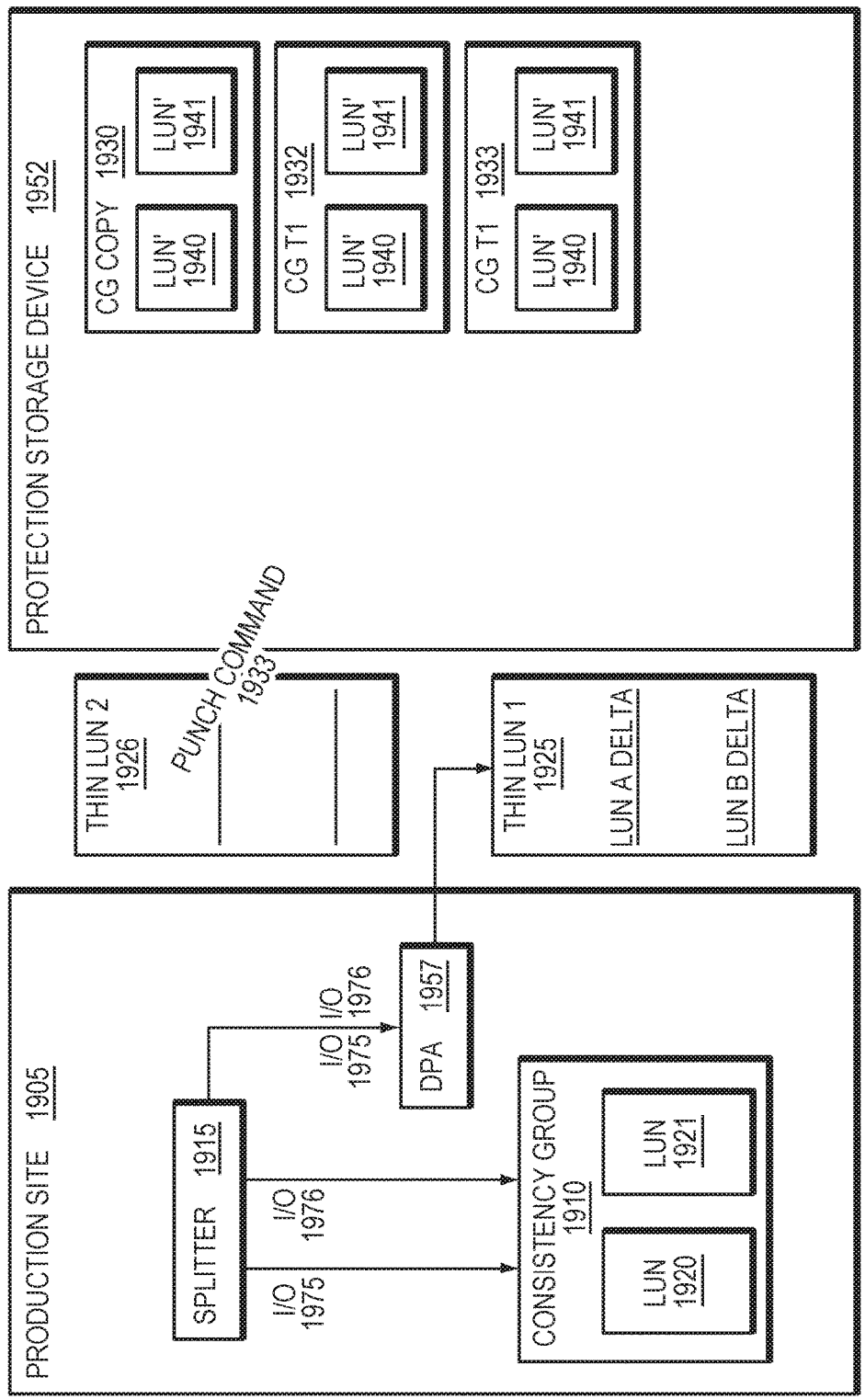
FIG. 19 is a simplified illustration of a data protection system with IO sent to a LUN being split to a first thin LUN and applying a punch command to a second thin LUN, where the first and second thin LUNs are not on the production site, in accordance with an embodiment of the present disclosure.

Refer now to the example embodiments of FIGS. 9*a* and 19, which illustrate applying a punch command to a thin LUN. In the example embodiment of FIG. 19, IO from splitter 1915 is sent to thin LUN 1 1925. In this embodiment, the snapshot differences represented by thin LUN 2 1926 are being cleared, erased, or zeroed by Punch command 1933 (step 920). Applying Punch command 1933 to thin LUN 1 1925 readies the LUN to begin tracking new IO sent to LUN 1920 and LUN 1921 of Consistency group 1910. In certain embodiments, clearing of data using a punch command may occur as data is transferred to protection storage device 1952 and all data need not be transferred before transferred data has begun to be cleared.

Figure 20:
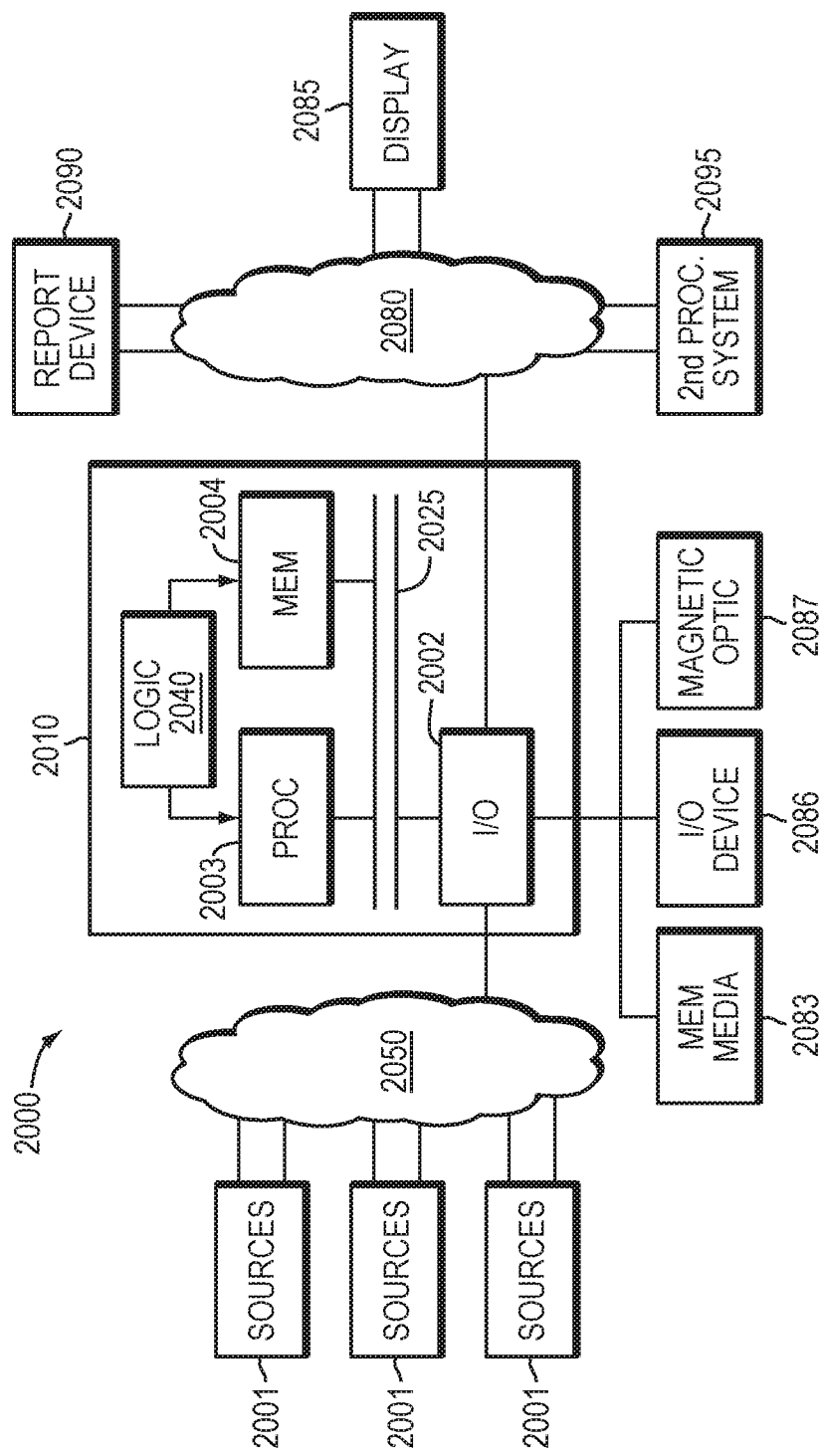
FIG. 20 is an example of an embodiment of an apparatus that may utilize the techniques described herein, in accordance with an embodiment of the present disclosure.
Figure 21:
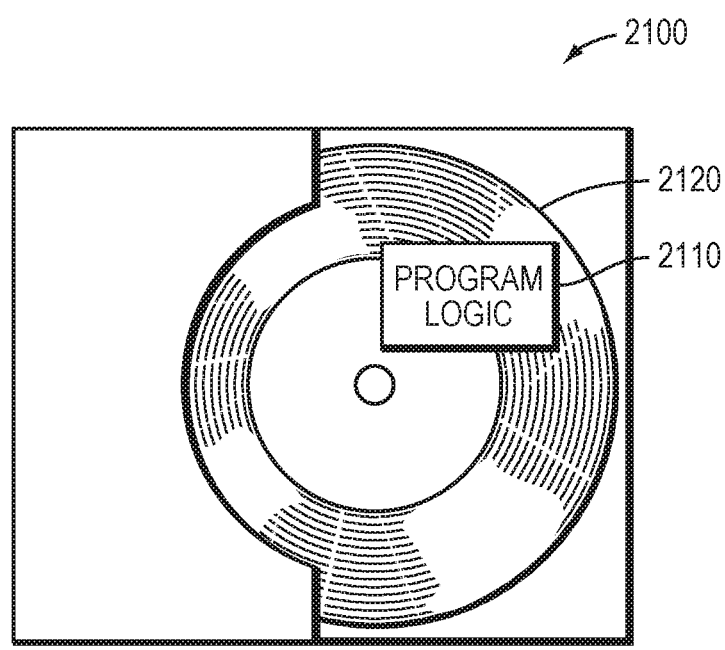
FIG. 21 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 20, the machine becomes an apparatus for practicing the invention. When implemented on one or more general-purpose processors, the program code combines with such a processor 2003 to provide a unique apparatus that operates analogously to specific logic circuits. As such a general purpose digital machine can be transformed into a special purpose digital machine. FIG. 21 shows Program Logic 2110 embodied on a computer-readable medium 2120 as shown, and wherein the Logic is encoded in computer-executable code configured for carrying out the reservation service process of this invention and thereby forming a Computer Program Product 2100. The logic 2110 may be the same logic 2040 on memory 2004 loaded on processor 2003. The program logic may also be embodied in software modules, as modules, or as hardware modules. A processor may be a virtual processor or a physical processor. Logic may be distributed across several processors or virtual processors to execute the logic. A storage medium may be a physical or logical device. A storage medium may consist of physical or logical devices. A storage medium may be mapped across multiple physical and/or logical devices. A storage medium may exist in a virtualized environment.

The logic for carrying out the method may be embodied as part of the system described below, which is useful for carrying out a method described with reference to embodiments shown in, for example, FIGS. 4, 5, and 9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
one or more processors;
computer-executable logic operating in memory, wherein the computer-executable program logic enables execution across the one or more processor of:
splitting IO directed to a LUN on a production site to a first thin LUN;
determining to take a snapshot of the LUN at a point in time;
reconfiguring the IO split from the LUN on the production site to be split to a second thin LUN, wherein the first and second thin LUNs are enabled to change size according to an amount of IO split to them, respectively; and
copying changes from the first thin LUN to a protection storage device.

2. The system of claim 1, wherein the logic further enables:
wherein copying changes includes, creating a copy of the LU data, creating a snapshot of the copy of the LU data, storing the snapshot on the protection storage device; applying changes stored in the first thin LUN to the snapshot stored on the protection storage device, and using a command to erase the data stored on the first thin LUN.

3. The system of claim 2 wherein a list of changes is obtained by a thin LU storage API reporting the allocated areas of a thin LU.

4. The system of claim 2, wherein a list of changes is obtained by tracking meta data of the IOs arriving at a DPA in a journal from the splitter; and wherein the logic further enables:
determining to take a second snapshot of the LUN at a second point in time;
reconfiguring the IO split from the LUN on the production site to be split to the first LUN; and
copying the changes from the second thin LUN to the protection storage device.

5. The system of claim 4 wherein the logic further enables:
using a command to zero the data stored on the first thin LUN.

6. The system of claim 5 wherein the first thin LUN and the second thin LUN are stored on a same storage medium where the LUN is stored.

7. The system of claim 5 wherein the first thin LUN and the second thin LUN are stored on a second storage medium and the LUN is stored on a first storage medium.

8. A computer program product comprising:
computer executable logic stored on a non-transitory computer readable medium, the logic enabling execution across one or more processor of:
splitting IO directed to a LUN on a production site to a first thin LUN;
determining to take a snapshot of the LUN at a point in time;
reconfiguring the IO split from the LUN on the production site to be split to a second thin LUN, wherein the first and second thin LUNs are enabled to change size according to an amount of IO split to them, respectively; and
copying changes from the first thin LUN to a protection storage device.

9. The computer program product of claim 8, wherein the logic further enables:
wherein copying changes includes, creating a copy of the LU data, creating a snapshot of the copy of the LU data, storing the snapshot on the protection storage device, applying changes stored in the first thin LUN to the snapshot stored on the protection storage device, and using a command to erase the data stored on the first thin LUN.

10. The computer program product of claim 9 wherein a list of changes is obtained by a thin LU storage API reporting the allocated areas of a thin LU.

11. The computer program product of claim 9, wherein a list of changes is obtained by tracking meta data of the IOs arriving at a DPA in a journal from the splitter; and wherein the logic further enables:
determining to take a second snapshot of the LUN at a second point in time;
reconfiguring the IO split from the LUN on the production site to be split to the first LUN; and
copying the changes from the second thin LUN to the protection storage device.

12. The computer program product of claim 11 wherein the logic further enables:
using a command to zero the data stored on the first thin LUN.

13. The computer program product of claim 12 wherein the first thin LUN and the second thin LUN are stored on a same storage medium where the LUN is stored.

14. The computer program product of claim 12 wherein the first thin LUN and the second thin LUN are stored on a second storage medium and the LUN is stored on a first storage medium.

15. A computer implemented method comprising:
splitting IO directed to a LUN on a production site to a first thin LUN;
determining to take a snapshot of the LUN at a point in time;
reconfiguring the IO split from the LUN on the production site to be split to a second thin LUN, wherein the first and second thin LUNs are enabled to change size according to an amount of IO split to them, respectively; and
copying changes from the first thin LUN to a protection storage device.

16. The method of claim 15, wherein copying changes includes,
creating a copy of the LU data, creating a snapshot of the copy of the LU data, storing the snapshot on the protection storage device, applying changes stored in the first thin LUN to the snapshot stored on the protection storage device, and using a command to erase the data stored on the first thin LUN.

17. The system of claim 16 wherein a list of changes is obtained by a thin LU storage API reporting the allocated areas of a thin LU.

18. The system of claim 16, wherein a list of changes is obtained by tracking meta data of the IOs arriving at a DPA in a journal from the splitter; and wherein the logic further enables:
determining to take a second snapshot of the LUN at a second point in time;
reconfiguring the IO split from the LUN on the production site to be split to the first LUN; and copying the changes from the second thin LUN to the protection storage device.

19. The system of claim 18 wherein the method further comprises
using a command to zero the data stored on the first thin LUN.

20. The system of claim 18 wherein the first thin LUN and the second thin LUN are stored on a same storage medium where the LUN is stored.

\* \* \* \* \*